United States Patent
Ito et al.

(10) Patent No.: US 7,444,520 B2
(45) Date of Patent: Oct. 28, 2008

(54) DATA CONVERSION SYSTEM FOR PROTECTING SOFTWARE AGAINST ANALYSIS AND TAMPERING

(75) Inventors: Yoshikatsu Ito, Hirakata (JP); Teruto Hirota, Moriguchi (JP)

(73) Assignee: Matsushita Eletric Industrial Co., Ltd., Osaka (JP)

( * ) Notice: Subject to any disclaimer, the term of this patent is extended or adjusted under 35 U.S.C. 154(b) by 782 days.

(21) Appl. No.: 10/856,941

(22) Filed: Jun. 1, 2004

(65) Prior Publication Data

US 2004/0260980 A1    Dec. 23, 2004

(30) Foreign Application Priority Data

Jun. 2, 2003    (JP) .............................. 2003-157254

(51) Int. Cl.
*G06F 9/00*    (2006.01)

(52) U.S. Cl. ........................ 713/187; 713/190; 713/191; 713/193

(58) Field of Classification Search ................. 713/187, 713/190, 191, 193
See application file for complete search history.

(56) References Cited

FOREIGN PATENT DOCUMENTS

JP    11-25000    1/1999

OTHER PUBLICATIONS

D. Aucsmith, et al., "Protecting Software Against Inverse Analysis and Tampering", *Nikkei Electronics*, No. 706, Jan. 5, 1998 (w/verified English Re-translation).
Hironaka Heisuke, "Encyclopedia of Mathematical Sciences", Osaka Shoseki Co., Ltd., Mar. 10, 1991 (Partial Translation).

*Primary Examiner*—Thomas R Peeso
(74) *Attorney, Agent, or Firm*—Wenderoth, Lind & Ponack, L.L.P.

(57) ABSTRACT

An execution system including a loader which (i) causes an error in a program which has been started within a range in which the caused error is correctable based on an error correcting code, and (ii) loads the program, in which the error is caused, into a main memory. Further, the execution system includes a processor which simultaneously corrects the error and executes the program.

19 Claims, 23 Drawing Sheets

FIG.22

| CPU PERFORMANCE INFORMATION /5611 | ERROR CAUSING AREA INFORMATION /5612 | /5610 |
|---|---|---|
| 2.66GHz | EXECUTABLE CODE PART, DATA PART | |
| 1.8GHz | EXECUTABLE CODE PART | |

DATA CONVERSION SYSTEM FOR PROTECTING SOFTWARE AGAINST ANALYSIS AND TAMPERING

BACKGROUND OF THE INVENTION (1) Field of the Invention

The present invention relates to the art of protecting executable programs and data against malicious analysis.

(2) Description of the Related Art

Unauthorized use of computer software through program analysis and tampering is a longstanding problem. For instance, an analyzer can execute software, which is designed to require a password to be executed, without entering the password by identifying and disabling the part of the code which checks a password. Also, software for viewing encrypted digital contents may include a cryptographic key for decryption. If the software is analyzed and the cryptographic key is identified, illegal copying of digital contents becomes possible.

In this way, malicious software analysis endangers software business and digital contents business.

To solve this problem, anti-tamper software technologies have been developed. One example of such technologies uses a complicated or redundant program so as to make the analysis with a disassembler or the like difficult (see "Non-patent Document 1").

However, all of the above-mentioned technologies are realized as contrivances during the programming phase. That is, in the executing phase, every kind of software protected by any anti-tamper technology is being represented as lines of instruction codes, which are understandable to a CPU, and being loaded into main memory. Therefore, analyzers can refer to the codes in the memory using a debugger, and rewrite the codes to follow operations of the program. By repeating execution and analysis of a program, analyzers can fully analyze the program.

<Non-Patent Document 1>

Tomohiro Inoue, "The protect II: Introduction to program analysis", Shuwa System Trading, March, 1987.

BRIEF SUMMARY OF THE INVENTION

The object of the present invention is therefore to provide a data conversion system which protects software against analysis and tampering in such a manner that, even if software is analyzed, it takes an immense amount of time.

The above object is fulfilled by a data conversion system comprising: a data obtaining unit operable to obtain data which is required to be kept secret; an error causing unit operable to convert the obtained data in such a manner that an error is caused in the obtained data, and a data output unit operable to output the conversion result data; wherein the error causing unit causes the error within a range in which the caused error is correctable based on the conversion result data and an error correcting code.

BRIEF DESCRIPTION OF THE DRAWINGS

These and the other objects, advantages and features of the invention will become apparent from the following description thereof taken in conjunction with the accompanying drawings which illustrate a specific embodiment of the invention. In the drawings:

FIG. 22 is an example of the structure and the content of information for determining error causing information.

DETAILED DESCRIPTION OF THE INVENTION

When an executable program is started, the program is usually loaded into main memory by a loader and executed by a processor. The executable program in the main memory is not protected against analysis, and is vulnerable to so-called malicious analysis. Therefore, there is a strong possibility that the program is analyzed with a debugger and tampered.

The present invention is for protecting an executable program which is loaded into main memory against malicious analysis by artificially causing an error in the executable program. The error artificially caused here is basically the same as an error which occurs during data transmission, or so-called noise.

However, the noise and the error of the present invention occur differently. As to data transmission, noise should be avoided. Noise occurs unexpectedly during the data transmission and is useless. Meanwhile, the error used in the present invention is artificially caused within a range in which the error is correctable based on an error correcting code that is created previously. The present invention uses noise, which is originally useless, on the premise that the error is correctable.

Therefore, the advantage of the present invention is that a variety of errors can be caused by creating different types of error correcting codes, and the amount and the position of the errors can be flexibly changed according to the level of importance of the program which is to be protected.

Also, it is easy to change the errors every time a program is loaded into main memory, because the errors are allowed to occur randomly within a certain range. As a result, the present invention frustrates an analyzer's trial and error, and makes the analysis difficult.

Figure 1:
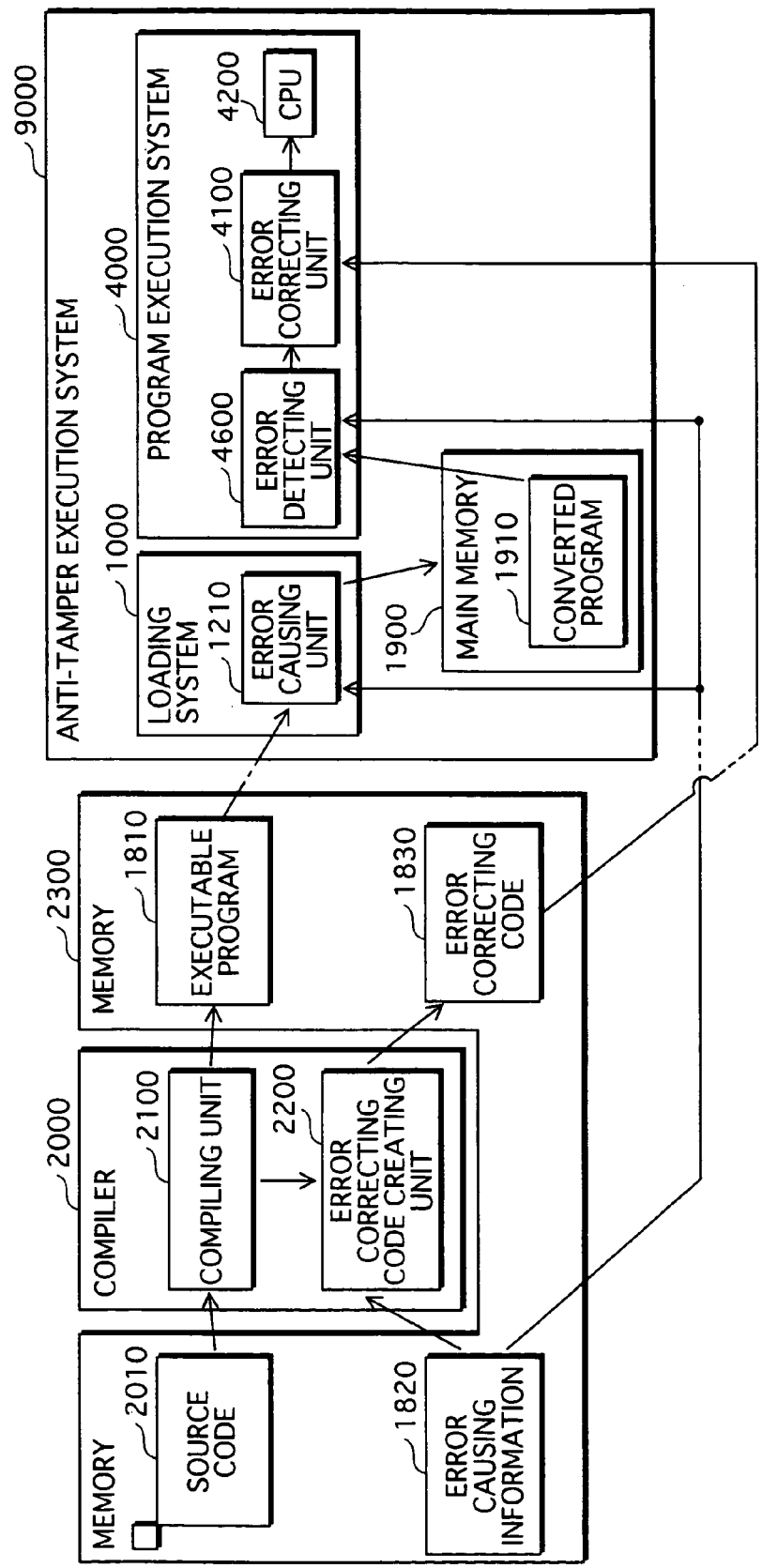
FIG. 1 is a functional block diagram of a conversion system according to the first preferred embodiment of the present invention.
Figure 2:
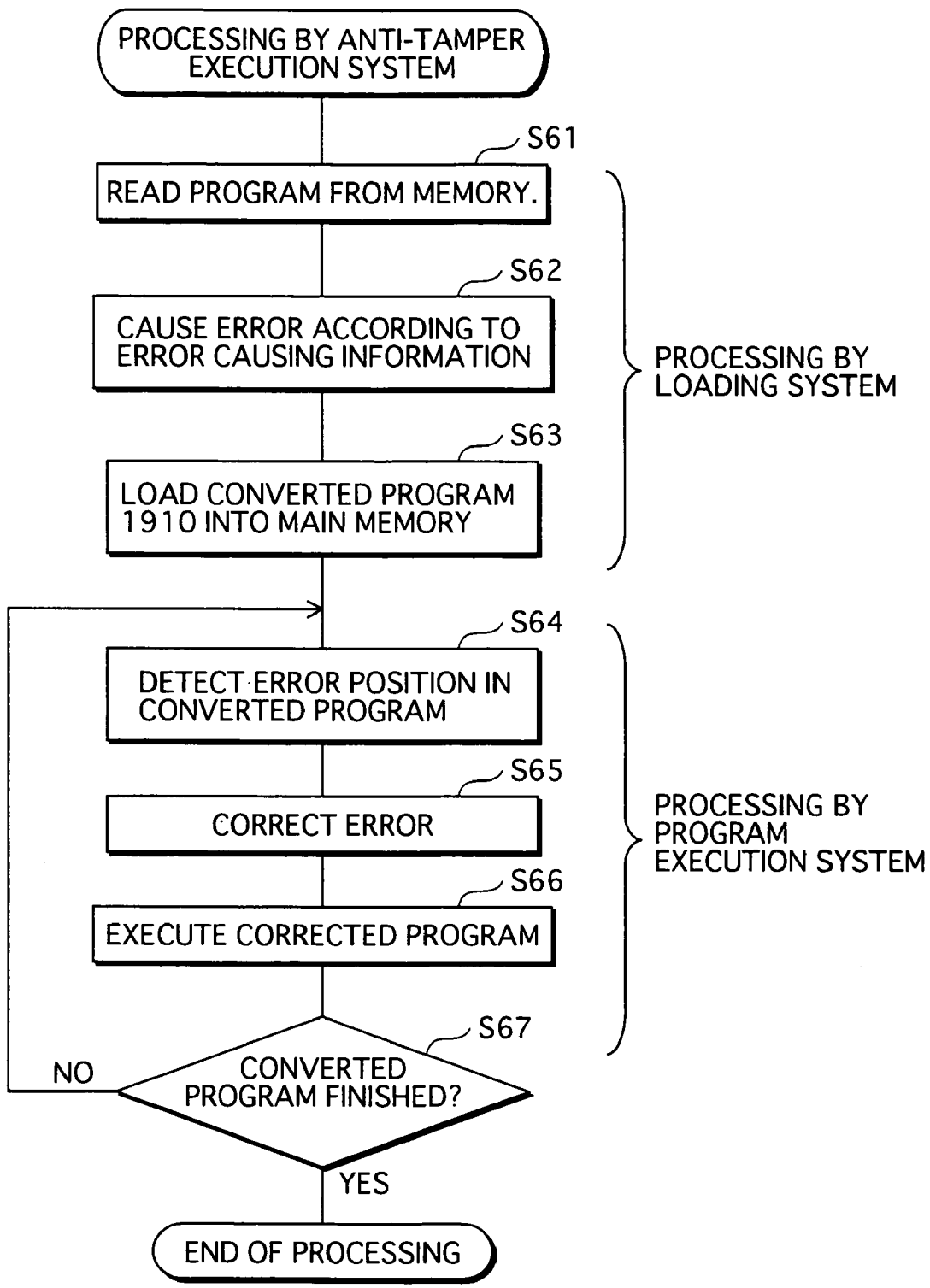
FIG. 2 is a flowchart which represents the processing of an anti-tamper execution system 9000.

The following describes a data conversion system according to a preferred embodiment of the present invention with reference to FIG. 1 and FIG. 2.

FIG. 1 is a functional block diagram of a conversion system according to the first preferred embodiment of the present invention.

Each system and data is described in detail in the section of the first embodiment and the second embodiment below.

An anti-tamper execution system 9000 is the core system of the present invention.

The anti-tamper execution system 9000 includes a loading system 1000, a program execution system 4000, and a main memory 1900. The loading system 1000 and the program execution system 4000 are protected by the anti-tamper technology. However, the main memory 1900 allows external accesses.

The loading system 1000 is a so-called loader, having a function of loading, into the main memory, a started executable program that is a program translated into a so-called object code. The loading system 1000 is different from an ordinary loader in that the loading system 1000 loads an executable program with artificially caused errors, while an ordinary loader loads a started executable program into main memory without modification.

Here, the loading system 1000 includes an error causing unit 1210, having a function of causing an error in an executable program 1810 based on error causing information 1820 in a memory 2300. A converted program 1910, which is an executable program with an error, is loaded into the main memory 1900 by the loading system 1000.

Also, the program execution system 4000 has a function of correcting the errors in the converted program 1910 and executing the program simultaneously.

The program execution system 4000 includes an error detecting unit 4600, an error correcting unit 4100, and a CPU 4200.

The error detecting unit 4600 has a function of detecting, based on the error causing information 1820 in the memory 2300, a position where an error is caused, and notifying the error correcting unit 4100 of the detected position.

The error correcting unit 4100, which is notified of the position of the error in the converted program, has a function of correcting the error using an error correcting code 1830 stored in the memory 2300, and transferring the corrected program to the CPU 4200. The CPU 4200 executes the transferred program from the error correcting unit 4100, which is an instruction code, instead of fetching a program in the main memory by itself.

A compiler 2000 has a function of creating an error correcting code in addition to a function of translating a source code into an object code, which an ordinary compiler has.

The compiler 2000 includes a compiling unit 2100 and an error correcting code creating unit 2200.

The compiling unit 2100 has a function of reading a source code, translating the source code into an object code, writing the executable program 1810, that is the translated program, into the memory 2300, and also transferring the executable program 1810 to the error correcting code creating unit 2200.

The error correcting code creating unit 2200, which received the executable program, has a function of creating the error correcting code 1830 based on the received executable program and the error causing information 1820 in the memory 2300, and writing the error correcting code 1830 into the memory 2300. The error causing information 1820 includes information which represents the data block length in the case where the executable program is blocked, and the length of the error correcting code. The error causing information 1820 is described in detail later.

The error correcting code 1830, which is created by the error correcting code creating unit 2200, is referred to when the program execution system 4000 corrects the error in the converted program 1910.

Also, the error causing information 1820 is referred to when the loading system 1000 causes an error in the executable program 1810, when the program execution system 4000 detects the error, and so on, as well as when the error correcting code creating unit 2200 creates the error correcting code 1830.

FIG. 2 is a flowchart which represents the processing of the anti-tamper execution system 9000.

The operation of the anti-tamper system 9000 is described below. The detailed operation is described in the first embodiment.

The anti-tamper execution system 9000 is executed when an executable program is started.

When the executable program is started, the loading system 1000 reads the started executable program 1810 from the memory 1800 into a work area of the loading system 1000 (step S61).

The error causing unit 1210 in the loading system 1000 causes an error in the executable program in the work area (step S62), and loads the converted program 1910, which is an executable program with an error, into the main memory 1900 (step S63). When causing an error, the error causing unit 1210 refers to the error causing information 1820 in the memory 2300.

The program execution system 4000 reads the converted program 1910 which is loaded into the main memory 1900, and the error detecting unit 4600 detects the position where the error is caused (step S64). For detecting the position, the error detecting unit 4600 refers to the error causing information 1820 in the memory 2300.

The information of the position where the error is caused is notified to the error correcting unit 4100, and the error correcting unit corrects the error (step S65). For correcting the error, the error correcting unit 4100 refers to the error correcting code 1830 on the memory 2300.

The converted program whose error is corrected is transferred to the CPU 4200, and executed (step S66). By the time the converted program finishes, the correction of the error in the converted program and the execution of the converted program by the CPU is repeated (step S67).

The steps S61 to S63 are the operations by the loading system 1000, and the steps S64 to S66 are the operations by the program execution system 4000.

Here, the compiler 2000 and the anti-tamper system are usually executed on separate apparatuses. The anti-tamper system 9000 stores the executable program 1810, the error correcting code 1830, and the error causing information 1820 in a HDD or a local memory in the anti-tamper system 9000, and executes the processing.

Note that the executable program loaded in the memory 2300 is not encrypted in the drawings as a matter of convenience, because the present invention is for preventing analysis of a program in the main memory. However, practically, an executable program in the memory 2300 is encrypted, and the loading system 1000 decrypts the encrypted executable program, and then the error causing unit 1210 starts its process.

THE FIRST EMBODIMENT

A compiler and an anti-tamper system, according to the first embodiment of the present invention, are described below with reference to FIGS. 3 to 19.

<Configuration>

<Configuration of the Compiler>

Figure 3:
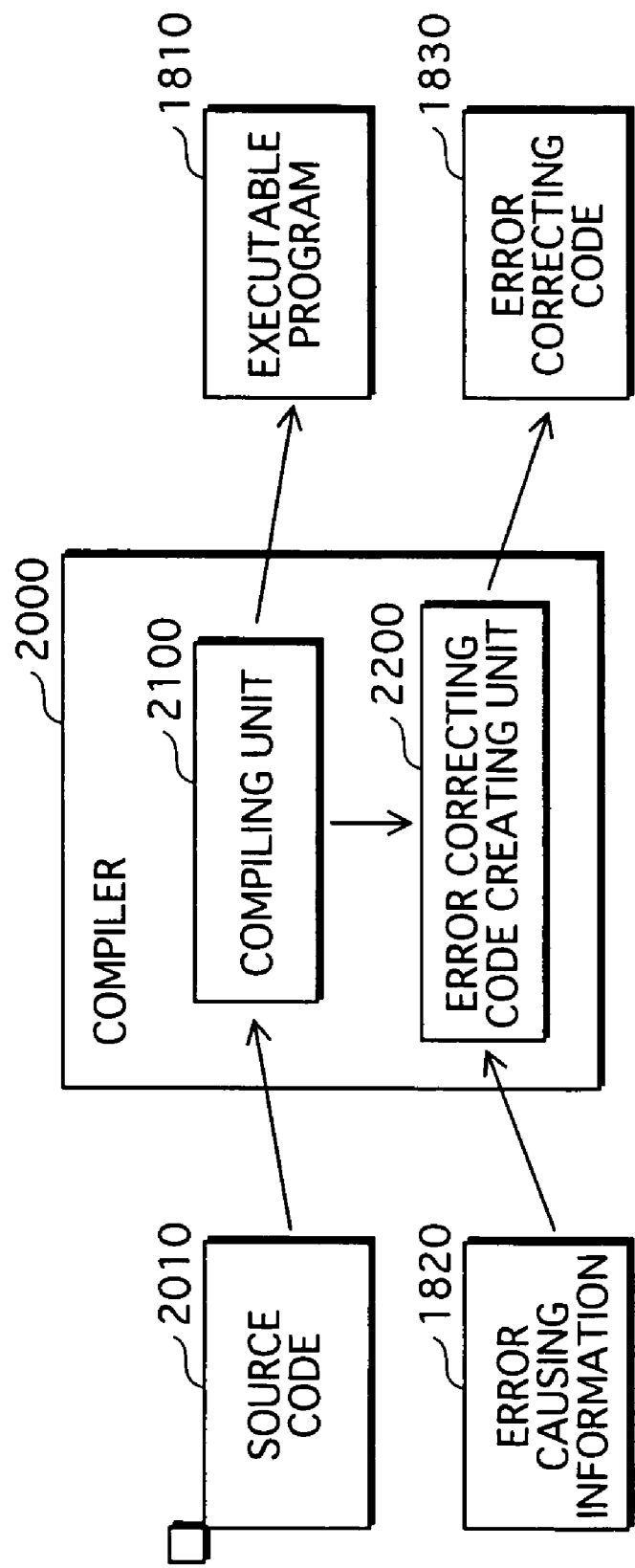
FIG. 3 is a functional block diagram of a compiler for creating an error correcting code.

FIG. 3 is a functional block diagram of a compiler for creating an error correcting code.

The compiler 2000 includes a compiling unit 2100 and an error correcting code creating unit 2200. The compiling unit 2100 has a function of translating a source code written in high-level language into an object code that is an executable program. The error correcting code creating unit 2200 creates an error correcting code 1830 based on error causing information 1820 and creates an executable program 1810 created by the compiling unit 2100.

<Configuration of the Anti-Tamper System>

The anti-tamper execution system 9000 includes the loading system 1000 and the program execution system 4000 (see FIG. 1).

The configurations of the loading system 1000 and the program execution system 4000 are described below.

<The Configuration of the Loading System>

Figure 4:
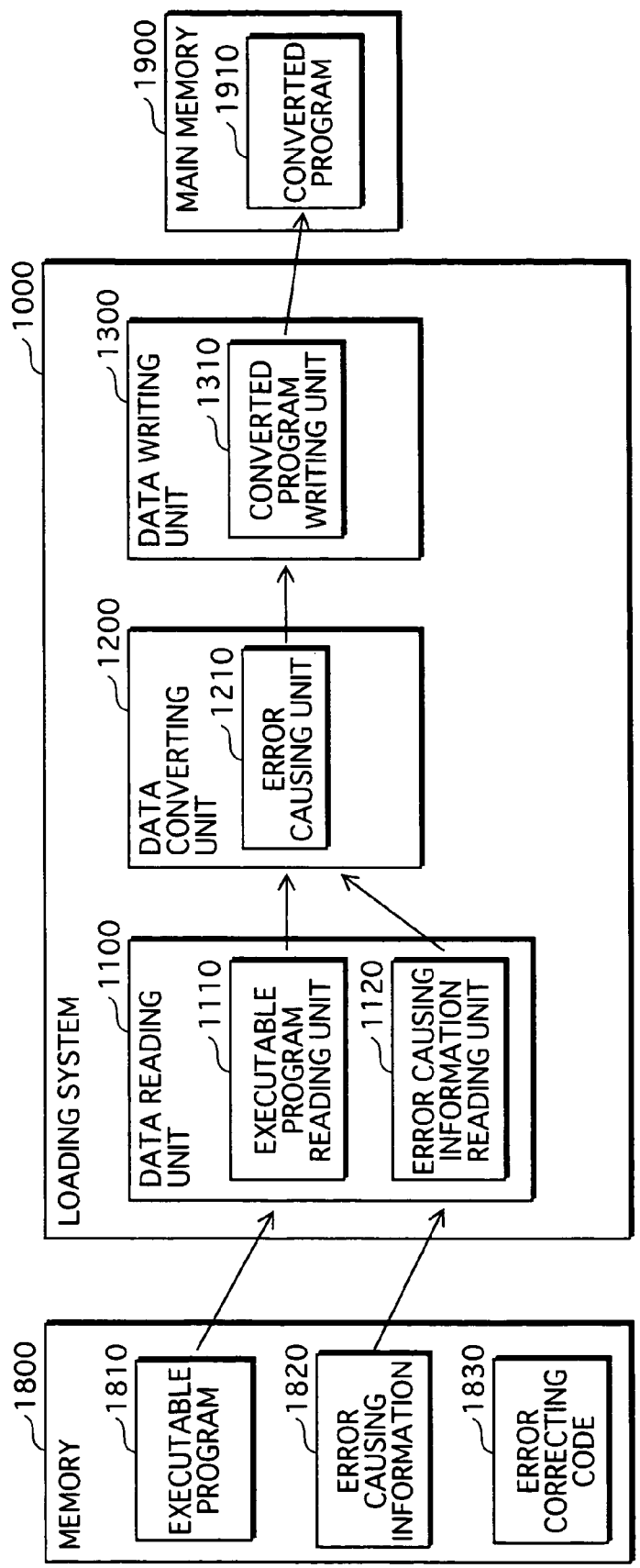
FIG. 4 is a functional block diagram of a loading system 1000 according to the first embodiment of the present invention.

FIG. 4 is a functional block diagram of the loading system 1000 according to the first embodiment of the present invention.

The loading system 1000 includes a data reading unit 1100, a data converting unit 1200 and a data writing unit 1300.

The data reading unit 1100 includes an executable program reading unit 1110 and an error causing information reading unit 1120 and has a function of reading data necessary for the loading system 1000 from a memory 1800.

The executable program reading unit 1110 has a function of (i) reading the executable program 1810 in the memory 1800, which is encrypted, into a work area of the loading system 1000, and (ii) decrypting the read encrypted executable program. The error causing information reading unit 1120 has a function of reading the error causing information 1820 in the memory into the work area of the loading system 1000.

An error causing information 1820 is described later with reference to FIG. 6. An error correcting code 1830 in the memory 1800 is not necessary for the loading system 1000. However, it is described in FIG. 4 because the error correcting code 1830 is used in the anti-tamper system 9000.

The data converting unit 1200 includes an error causing unit 1210. The error causing unit 1210 has a function of causing an error in the executable program 1810 based on the error causing information 1820 which is read by the error causing information reading unit 1120. The error caused by the error causing unit 1210 is described later with reference to FIG. 6.

The data writing unit 1300 includes a converted program writing unit 1310 which has a function of writing a converted program 1910 into main memory 1900. The converted program 1910 is the executable program 1810 in which an error is caused by the error causing unit 1210.

<The Configuration of the Program Execution System>

Figure 5:
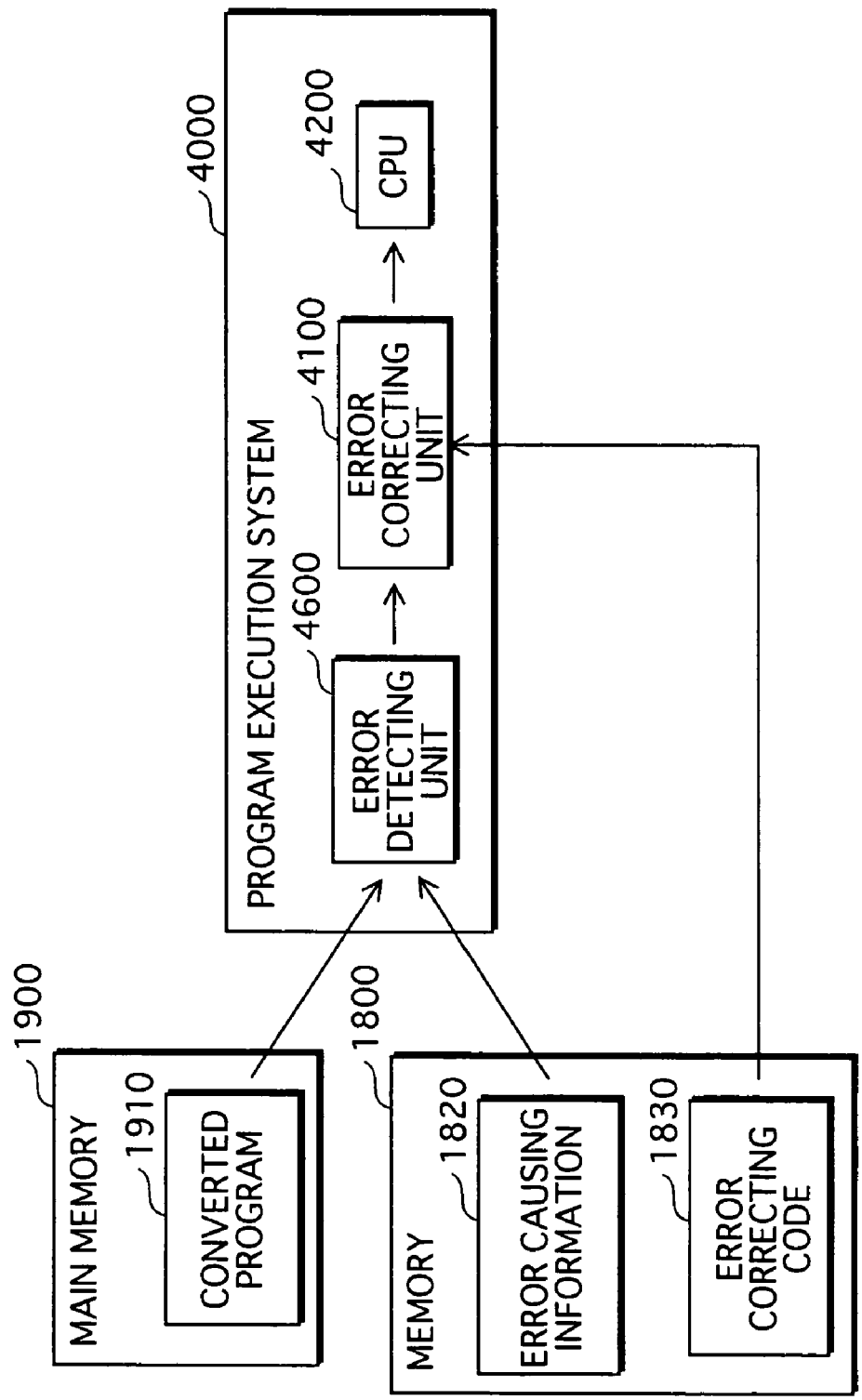
FIG. 5 is a functional block diagram of a program execution system according to the first embodiment of the present invention.

FIG. 5 is a functional block diagram of a program execution system according to the first embodiment of the present invention.

The program execution system 4000 includes an error detecting unit 4600, an error correcting unit 4100, and a CPU 4200.

The error detecting unit 4600 has a function of detecting a position of an error in a converted program 1910 in a main memory 1900 by referring to error position information included in the error causing information 1820 in the memory 1800. The detected position where the error is caused is notified to an error correcting unit 4100. The error position information is described later with reference to FIG. 7.

The error correcting unit 4100, which notifies the detected position where an error is caused, has a function of correcting the error in the converted program 1910 by referring to an error correcting code 1830. The error correcting unit 4100 also has a function of transferring the converted program whose error is corrected to the CPU.

The CPU 4200, which the converted program whose error is corrected is transferred to, has a function of executing the converted program whose error is corrected.

<Data>

Main data which is used by the anti-tamper system 9000 is described below with reference to FIGS. 6 to 9.

Figure 6:
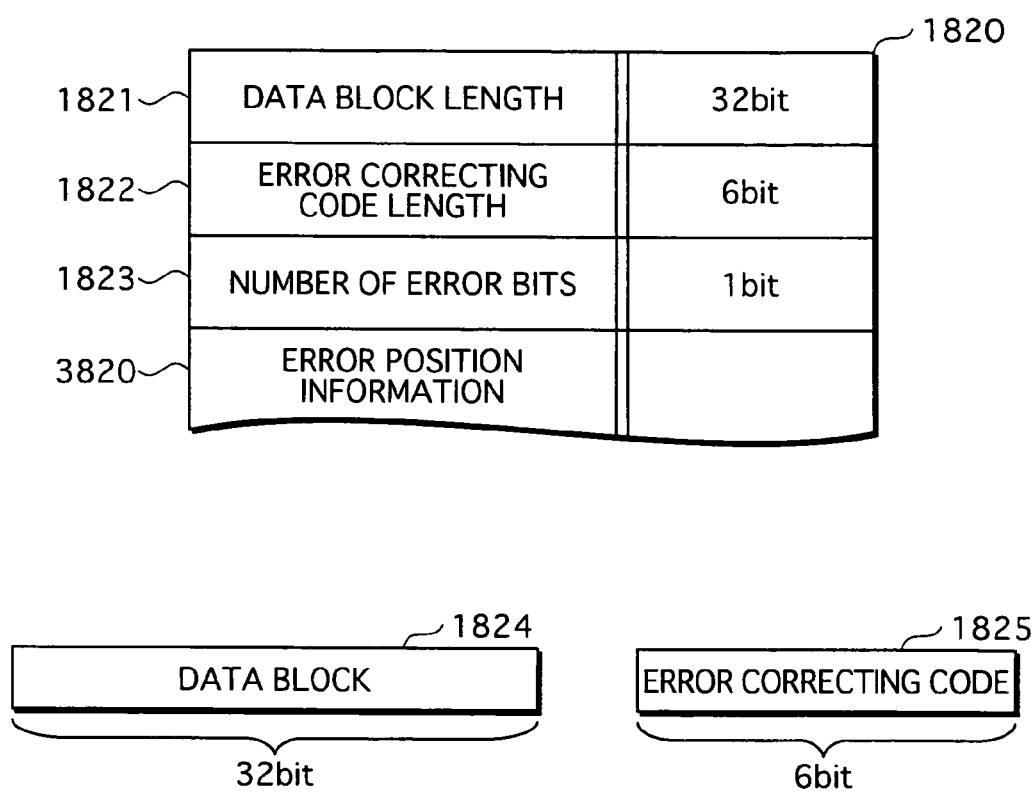
FIG. 6 is an example of the structure and the content of error causing information.

FIG. 6 is an example of the structure and the content of the error causing information.

The error causing information 1820 includes a data block length 1821, an error correcting code length 1822, a number of error bits 1823, and error position information 3820.

The data block length 1821 is a bit length of one data block, which is a unit of an error caused in the executable program 1810. The error correcting code length 1822 is a number of bits of the error correcting code by which errors in one data block are correctable. The number of error bits 1823 is a maximum number of error bits which can be caused in one data block.

In FIG. 6, it is described that a one-bit error can be caused in one 32-bit data block 1824 in the executable program, and the error caused in the one data block is correctable with a 6-bit error correcting code 1825. Causing error means inverting bits at a position where an error is to be caused.

Figure 7:
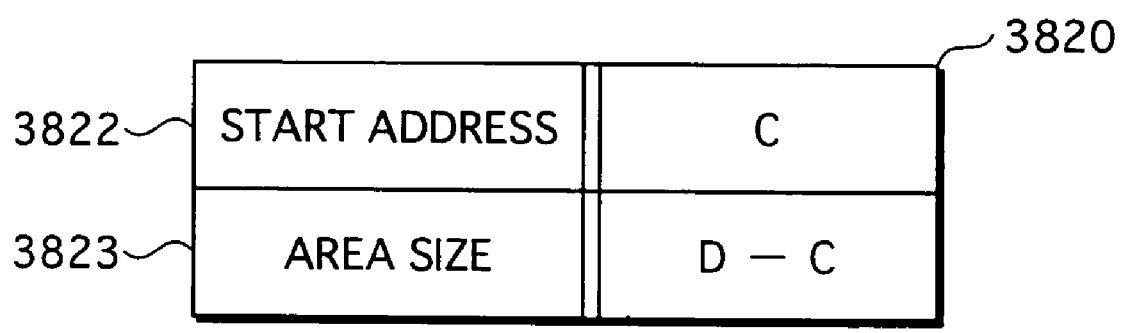
FIG. 7 is an example of the structure and the content of error position information.

FIG. 7 is an example of the structure and the content of error position information. The error position information 3820 is included in the error causing information 1820.

The error position information 3820 indicates an area where an error is to be caused. One piece of the error position information 3820 indicates one area. Therefore, when causing errors in plural unsuccessive areas, the number of pieces of error position information needed is the same as the number of areas where errors are to be caused.

The error position information 3820 includes a start address 3822 and an area size 3823.

The start address is a beginning address of an area in which an error is caused, and the area size 3823 is a size of the area.

In FIGS. 6 and 7, it is described that an area from a start address "C" whose area size is "D-C" (address D minus address C) is divided into 32-bit data blocks, and an error no more than 1 bit is caused in each data block.

The address "C" and the area size "D-C" are described later with reference to FIG. 8.

Figure 8:
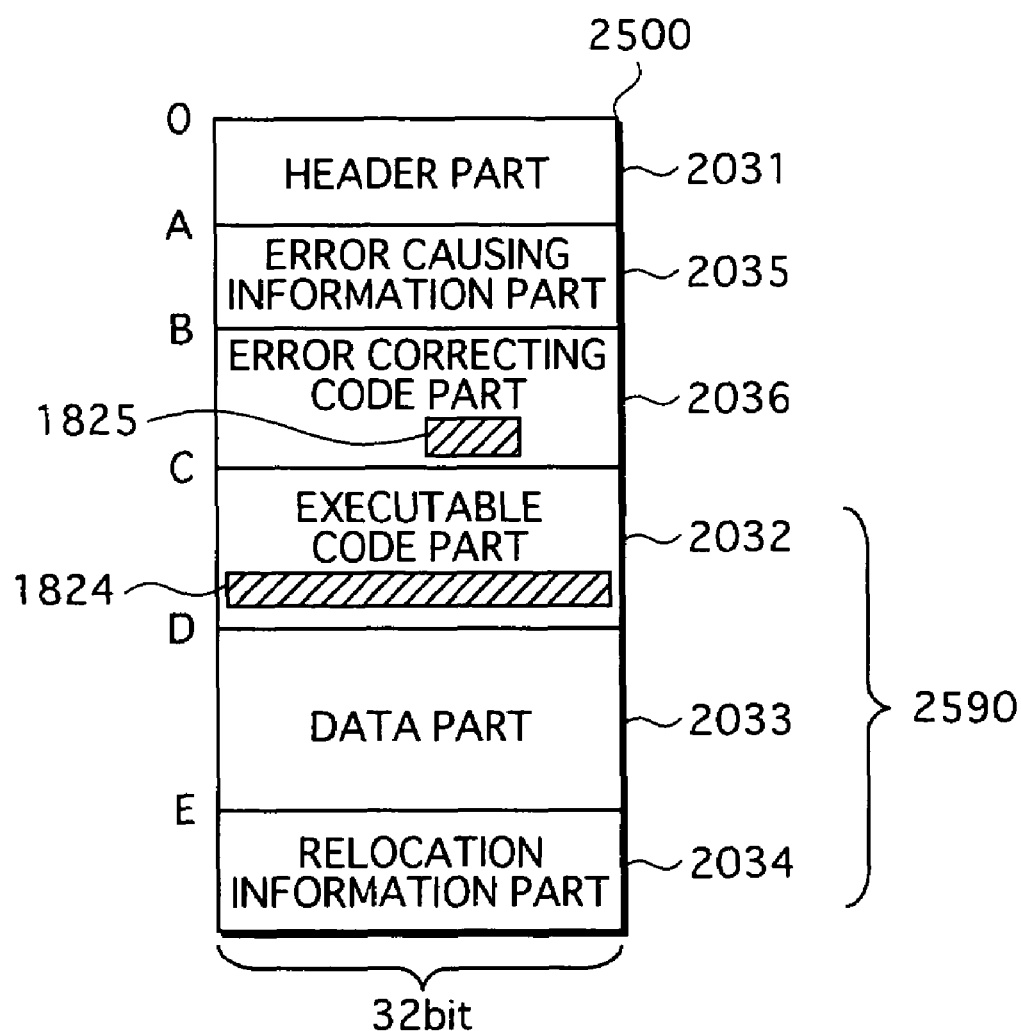
FIG. 8 is an example structure of input data of an anti-tamper execution system.

FIG. 8 is an example structure of an input data of the anti-tamper execution system.

An executable program 2500 includes a header part 2031, an error causing information part 2035, an error correcting code part 2036, an executable code part 2032, a data part 2033, and a relocation information part 2034.

The input data is necessary for the anti-tamper execution system, and is loaded into the main memory by the loading system 1000.

The header part 2031 includes information about the whole executable program, such as a program size, a start address of each part, and a size of each part. The executable code part 2032 includes instructions of the program, including instruction codes and operands. The data part 2033 includes data which is used by the program.

The relocation information part 2034 includes relocation information for locating the program into main memory.

The error causing information part 2035 includes the error causing information of FIG. 6 and FIG. 7. The error correcting code part 2036 includes the error correcting code 1830, and is a group of a plurality of the error correcting code 1825.

Signs A to E on the left side of FIG. 8 represent relative addresses relative to the beginning address. Signs B, C, and D in FIG. 9 are relative addresses as well.

Note that an error causing possible area 2590, which is an area in which an error can be caused, includes the executable code part 2032, the data part 2033, and there location information part 2034, and does not include the error correcting code part 2036. Therefore, the data block 1824 is included in the error causing possible area 2590.

The following is a supplementary description of FIG. 7. The sign "C" representing the start address 3822 is the offset address of the executable code part 2032 relative to the beginning of the executable program 2500. The sign "D" represents the offset address of the data part 2033 following the executable code part. The area size 3823 or "D-C" represents the area size of the executable code part 2032.

Figure 9:
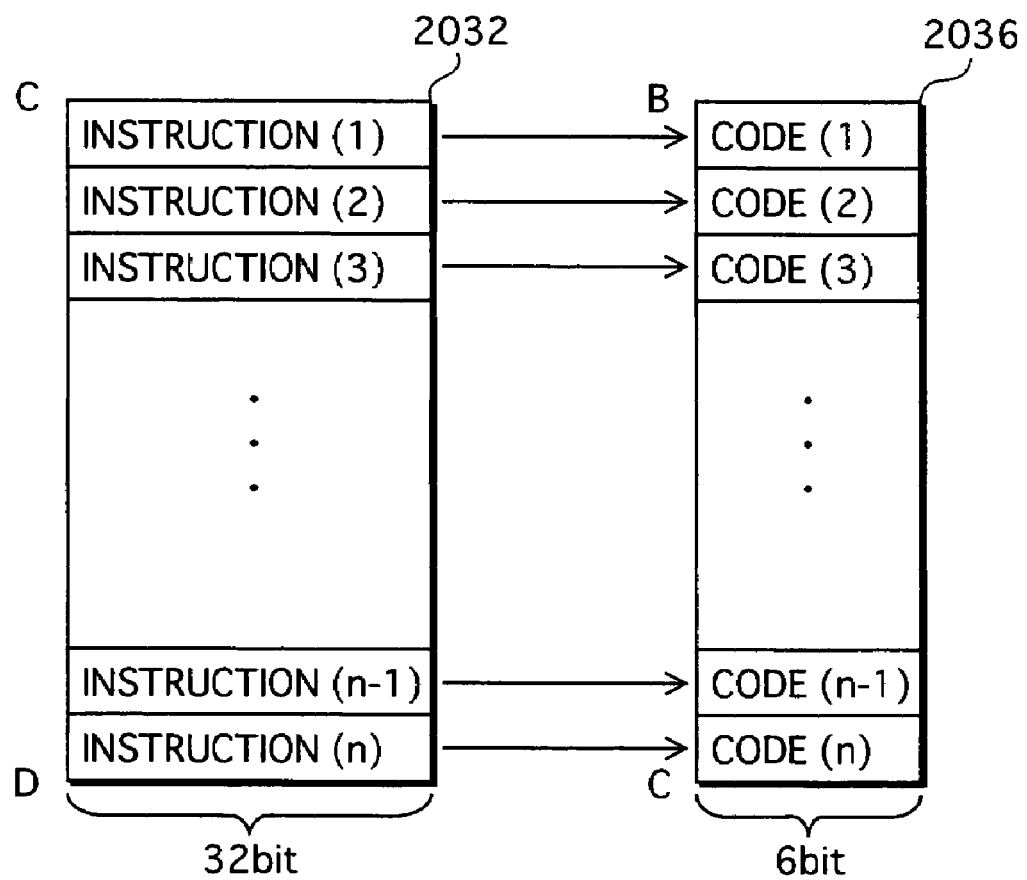
FIG. 9 represents the relation between an executable code part and an error correcting code part.

FIG. 9 represents the relation between the executable code part and the error correcting code part.

In this example, the executable code part 2032 is comprised of 32-bit instructions and one data block represents one instruction. The error correcting code part 2036 is comprised of 6-bit error correcting codes.

The error correcting code for the first data block "instruction (1)" is the first error correcting code "code (1)" in the error correcting code part 2036.

The error correcting code for the second data block "instruction (2)" is "code (2)" which is next to "code (1)". In this way, data blocks and error correcting codes are successively located in each area.

<Operation>

The operation of the compiler 2000 and the anti-tamper execution system 9000 with the above-described configuration is described below with reference to FIGS. 10 to 12.

When a source code is completed, the error causing information 1820 is created according to the level of importance of the program, in other words, according to the level of protection of the program against analysis and tampering.

As an example, a 32-bit data block and a 6-bit error correcting code, which is a hamming code, are used here. Not more than one bit is correctable with the error correcting code. Therefore, as the error causing information 1820 in FIG. 6, the data block length 1821 is 32 bits, the error correcting code length 1822 is 6 bits, and the number of error bits 1823 is one bit in this example.

Also, the error position information 3820 is set to cause an error only in the executable code part in the example. Here, the error position information is set by the compiler according to an instruction from the user which indicates the area where an error is to be caused.

The processing of the compiler 2000 is described below with reference to FIG. 10.

Figure 10:
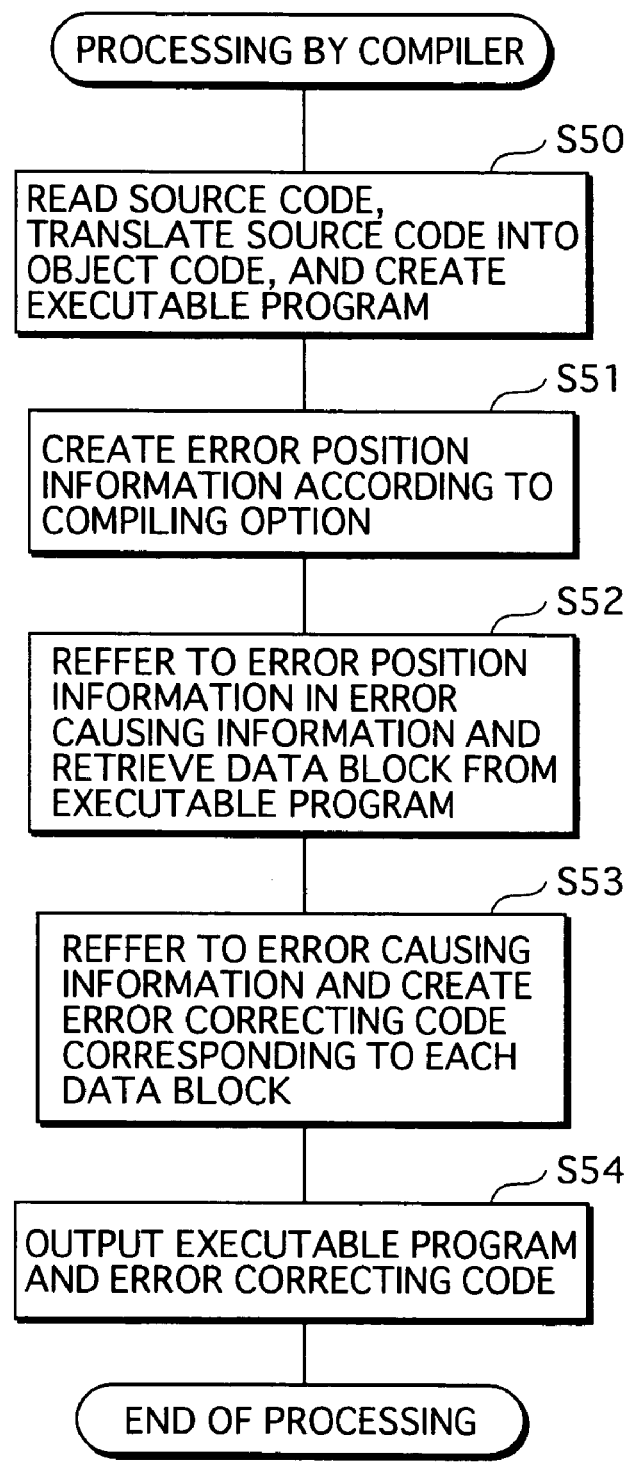
FIG. 10 is a flowchart representing the processing of a compiler.

FIG. 10 is a flowchart representing the processing of the compiler.

The started compiler reads a source code 2010 from the memory, translates the source code into an object code by the compiling unit 2100, and creates the executable program 1810 (step S50). The created executable program 1810 is transferred to the error correcting code creating unit 2200.

After that, the compiler creates the error position information 3820 according to the set compiling option, that is an instruction from the user which indicates the area where an error is to be caused, and adds the error position information 3820 to the error causing information 1820 (step S51). More specifically, the compiler obtains the beginning address and the area size of the area where an error is to be caused, and sets them as the start address 3822 and the area size 3823 of the error position information 3820 respectively.

The error position information including the start address 3822 represented by the sign "C" and the area size 3823 represented by the sign "D-C" is created as the example in FIG. 7.

Then, the error correcting code creating unit 2200 which received the executable program 1810 creates the error correcting code 1830 based on the received executable program and the error causing information 1820.

The error correcting code creating unit 2200 retrieves 32-bit data blocks beginning from the start address 3822 represented by the sign "C" (step S52), and creates 6-bit error correcting code 1825 based on the each retrieved data block (step S53). The error correcting code creating unit creates error correcting codes corresponding to all data beginning from the start address in the area whose area size is the area size 3823.

The compiler sets the error correcting code 1825 in the error correcting code part 2036, and outputs the executable program as the executable program 2500 (step S54).

The following is the description of the processing of the loading system 1000 when the executable program 2500 is started.

When the executable program 2500 is started, the data reading unit 1100 included in the loading system 1000 reads necessary data into the work area. The executable program reading unit 1110 reads the executable program, and the error causing information reading unit 1120 reads the error causing information 1820.

In the case of reading the executable program 2500, there is no need to read data other than the executable program 2500, because the executable program 2500 includes the error causing information part 2035.

The data reading unit 1100 reads the executable program into the work area of the loading system, and then, decrypts the encrypted executable program 2500.

The data converting unit 1200 causes an error in the executable program after necessary data is read. The processing of causing error is described with reference to FIG. 11.

Figure 11:
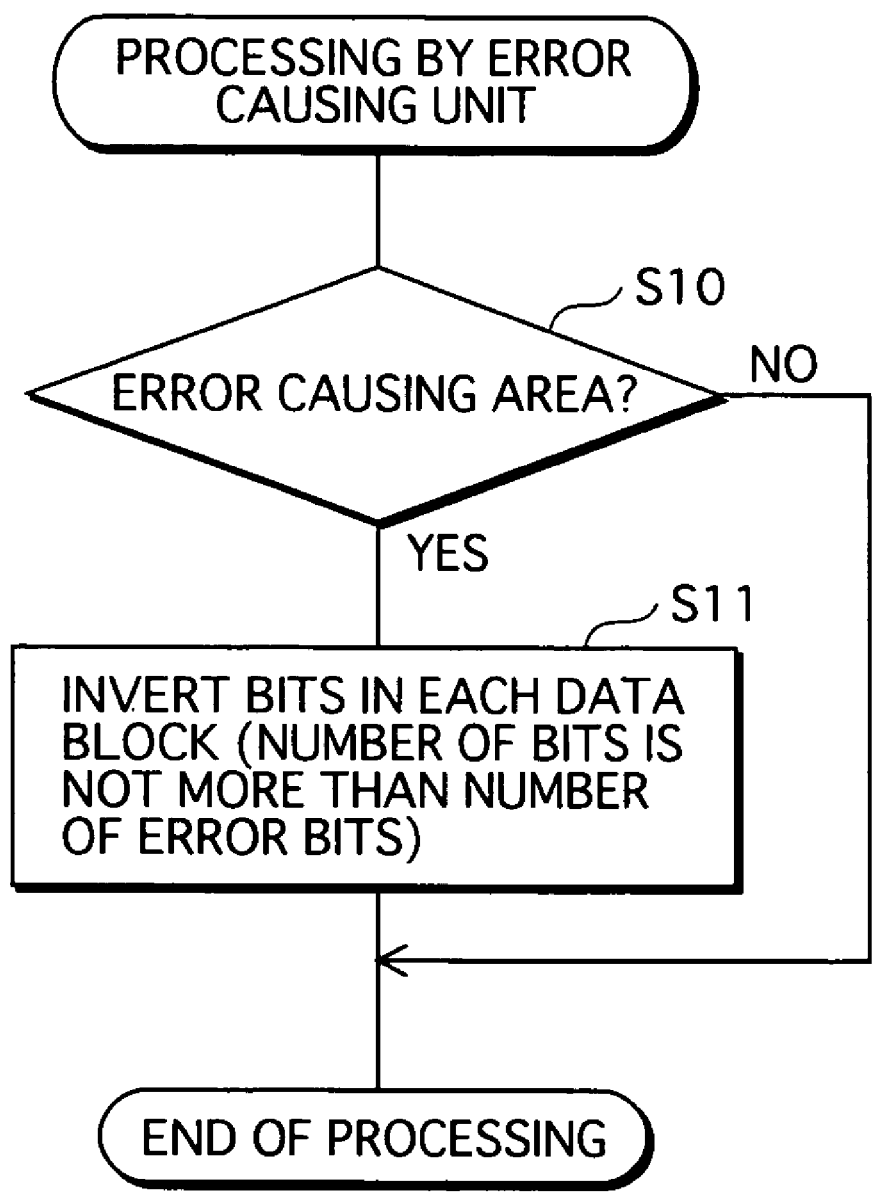
FIG. 11 is a flowchart representing the processing of an error causing unit.

FIG. 11 is a flowchart representing the processing of the error causing unit.

The error causing unit 1210 obtains information indicating where to cause an error from error position information 3820 included in the error causing information part 2035, and causes an error based on the error causing information 1820.

However, the error causing unit 1210 refers to the relocation information included in the relocation information part 2034, and does not cause an error in the data which is to be relocated.

The error causing unit 1210 retrieves a plurality of 32-bit data in the area beginning from the offset address "C" of the executable program 2500 in sequence (step S10), and inverts one bit in the each data (step S11). The bit to be inverted is chosen randomly. The error causing unit 1210 repeats these processing for all data in the area whose area size is area size 3823 represented by "D-C"

After that, the converted program writing unit 1310 included in the data writing unit 1300 writes, into the main memory 1900, the converted program 1910 in which errors are caused in the area which begins from the address "C" and whose area size is "D-C", that is the executable code part.

After the executable program is loaded into the main memory, the executable program is executed by the program execution system.

The processing of the program execution system 4000 is described below with reference to FIG. 12.

Figure 12:
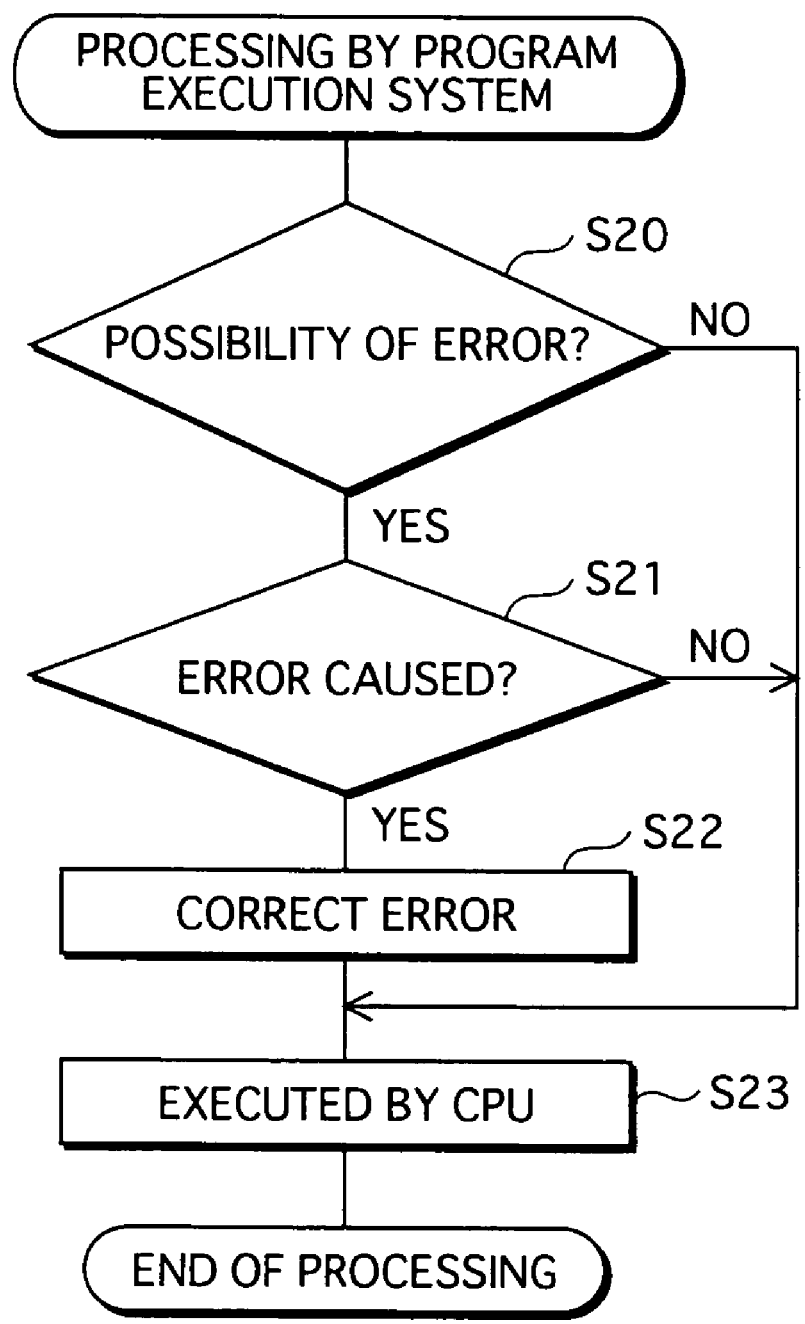
FIG. 12 is a flowchart representing the processing of a program execution system.

FIG. 12 is a flowchart representing the processing of the program execution system.

After the loading system 1000 causes an error in the executable program 2500 and loads the converted program into the main memory 1900, control is passed to the program execution system 4000.

The program execution system 4000 which gained control executes the converted program in the main memory as the program execution system corrects errors in the converted program.

The error detecting unit 4600 judges whether a program data of the converted program 1910 has a possibility of causing an error, based on the error causing information 1820 (step S20).

When the program data has no possibility of causing an error, the detecting unit transfers the program data to the CPU 4200 and the CPU 4200 executes the program data (step S23). When the program data has a possibility of causing an error, the detecting unit actually checks the data (step S21).

When an error is actually detected, the error detecting unit 4600 transfers the data with an error to the error correcting unit 4100.

The error correcting unit 4100, which received the data, corrects the data with reference to the error correcting code 1830 (step S22), and then, transfers the corrected data to the CPU. The CPU which received the data executes the program data (step S23). When no error is detected, the error detecting unit 4600 transfers the data to the CPU without correction. The CPU which received the data executes the program data (step S23).

In the example, according to the error causing information 1820 included in the error causing information part 2035, an error is caused in the executable code part 2032 (step S20) (see FIG. 7 and FIG. 8). Therefore, when the executable code part is read, the detecting unit checks whether an error is caused in the executable code part (step S21).

Whether an error is caused is checked based on the error correcting code 1830 corresponding to the error correcting cord part 2036.

When an error is detected through this check, the error is corrected based on corresponding error correcting code (step S22), and the corrected data is transferred to the CPU and processed (step S23). When no error is detected through this check, the data is transferred to the CPU without correction and processed.

Meanwhile, when the data part is referred to, the data is transferred to the CPU without the check because there is no error in the data part (see FIGS. 7 and 8).

<The First Modification>

In the first embodiment, the error caused in the executable program is meaningless in itself, but it is possible to include information with meanings in the error.

For instance, the collection of error bits in the executable program, which is executed, can be a key for decryption for another encrypted executable program.

Figure 13:
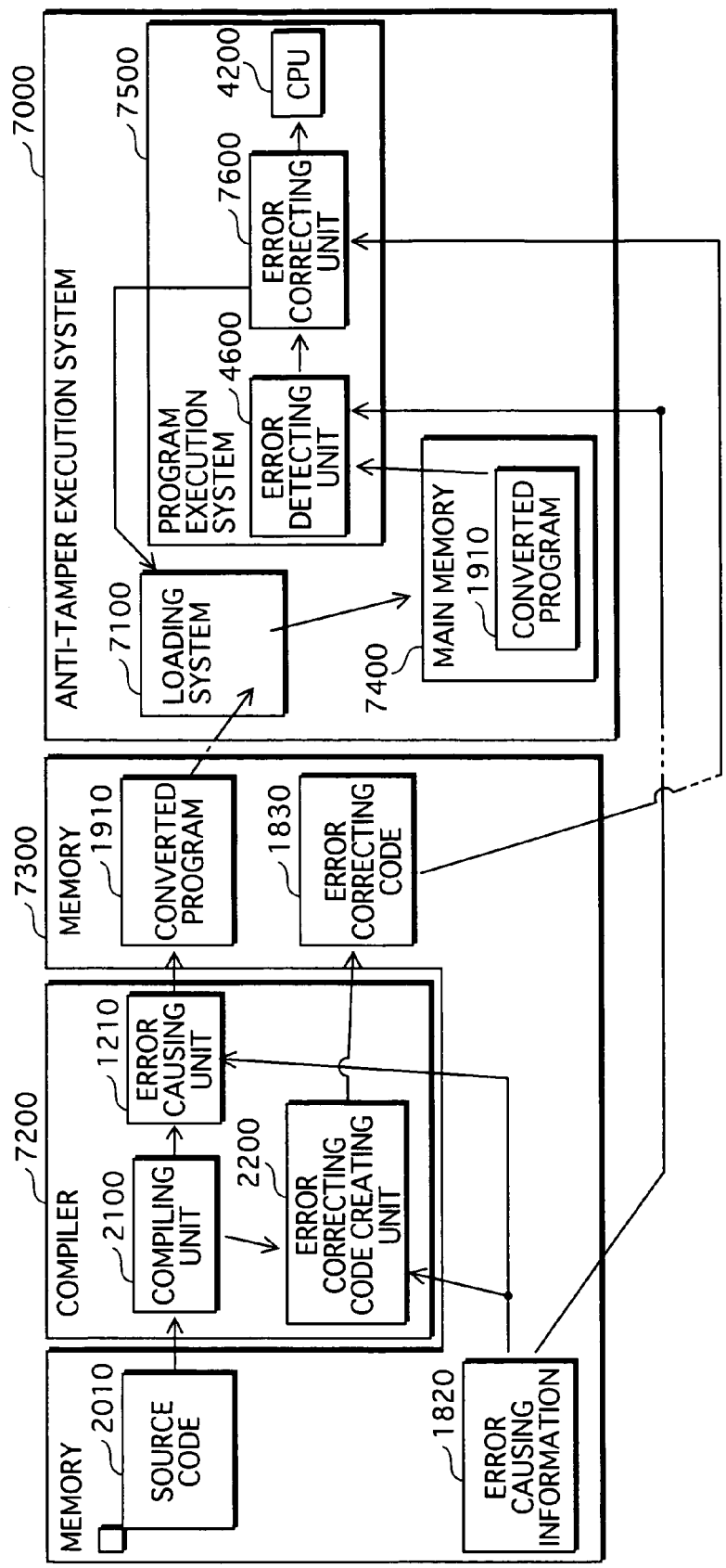
FIG. 13 is a functional block diagram of the system in the case where meaningful information is included in errors.

FIG. 13 is a functional block diagram of the system in the case where information with meanings is included in errors.

The difference between FIG. 13 and FIG. 1 is that in FIG. 13 the error causing unit 1210 is included in the compiler 7200, not in the loading system 7100. A function of each unit is same as in the FIG. 1 except the error correcting unit 7600. Processing of the error correcting unit 7600 is described in detail later.

The operation of the system according to the first modification of the present invention is described below.

Information with meanings, which is to be included in the source code, is set in the error causing information 1820. Here, the information with meanings is a key for decryption for an encrypted executable program which is to be executed after the execution of the source code.

The compiler 7200 reads the source code 2010 from the memory 7300, and the compiling unit 2100 creates an executable program. The executable program created by the compiling unit 2100 is transferred to the error causing unit 1210 and the error correcting code creating unit 2200.

The error causing unit 1210 causes an error with meanings in the executable program received from the compiling unit 2100. For causing the error, the error causing unit 1210 refers to the error causing information 1820. Then, the error causing unit 1210 writes the converted program 1910, which is the executable program in which the error is caused, in the memory 7300.

Meanwhile, the error correcting code creating unit 2200 creates the error correcting code 1830 based on the executable program received from the compiling unit 2100. For creating the error correcting code, the error correcting code creating unit 2200 refers to the error causing information 1820. Then, the error correcting code creating unit 2200 writes the created error correcting code in the memory 7300.

The converted program 1910, which is written into the memory 7300, is encrypted and loaded into a HDD or the like of a computer which executes the program. The error causing information 1820 and the error correcting code 1830 are loaded in the same way.

After that, when the converted program 1910 is started, the loading system 7100 included in the anti-tamper execution system 7000 decrypts the encrypted converted program 1910 and load the decrypted converted program into the main memory 7400.

The error detecting unit 4600 reads the converted program 1910 in the main memory 7400, detects the position of errors in the converted program, and transfers data with errors to the error correcting unit 7600.

The error correcting unit 7600, which received the data with errors, corrects and collects the errors, and then creates a key for decryption which is information with meanings from the collected errors. The error correcting unit transfers the key for decryption to the loading system. Processing of the error correcting unit 7600 is described in detail with reference to FIG. 14.

Figure 14:
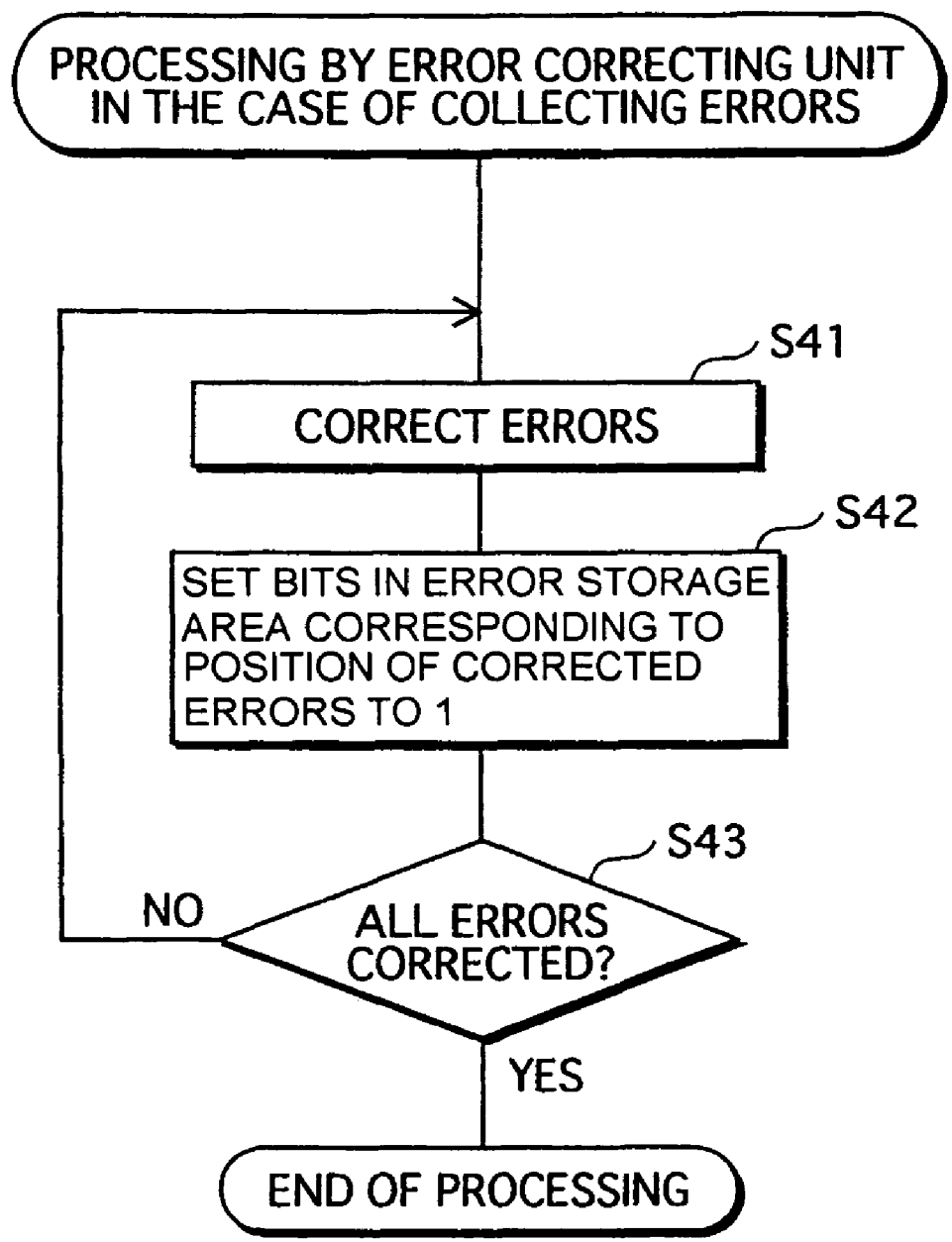
FIG. 14 is a flowchart representing the processing of an error correcting unit in the case of collecting errors.

FIG. 14 is a flowchart representing the processing of the error correcting unit in the case of collecting errors.

The error correcting unit 7600 transfers the corrected data to the CPU 4200. The CPU 4200 processes the received data.

When the execution of the executable program finishes and the next encrypted executable program is started, the loading system 7100 decrypts the encrypted executable program with the key for decryption received from the error correcting unit 4100, and loads the decrypted program into the main memory 7400.

After that, the executable program loaded into the main memory is executed by the program execution system.

FIG. 14 is a flowchart representing the processing of the error correcting unit in the case of collecting errors.

Here, the error correcting unit 7600 has, within its work area, an error storage area whose size is same as the data block length 1821 (see FIG. 6), and the error storage area is cleared to zero.

The error correcting unit 7600, which received data with errors from the error detecting unit 4600, corrects the errors with reference to the corresponding error correcting code 1830 (step S41).

The error correcting unit 7600 turns on bits in the error storage area corresponding to the position of the corrected errors (step S42).

When all the errors in the executable program are corrected (step S43), the key for decryption is completed.

After that, the error correcting unit 7600 transfers the completed key for decryption to the loading system.

<The Second Modification>

FIG. 3 is a functional block diagram of the compiler for creating the error correcting code. The compiler in FIG. 3 translates the source code into the executable program, and at the same time, creates the error correcting code.

The second modification is an example of a tool for creating an error correcting code corresponding to an executable program which is created by a conventional compiler.

With the error correcting code creating tool, an error correcting code 1830 corresponding to a source code written in high-level language which is not supported by the compiler of FIG. 3 can be created by creating an executable program with a conventional compiler. Also, an error correcting code 1830 corresponding to an already created executable program can be created without recompilation.

Figure 15:
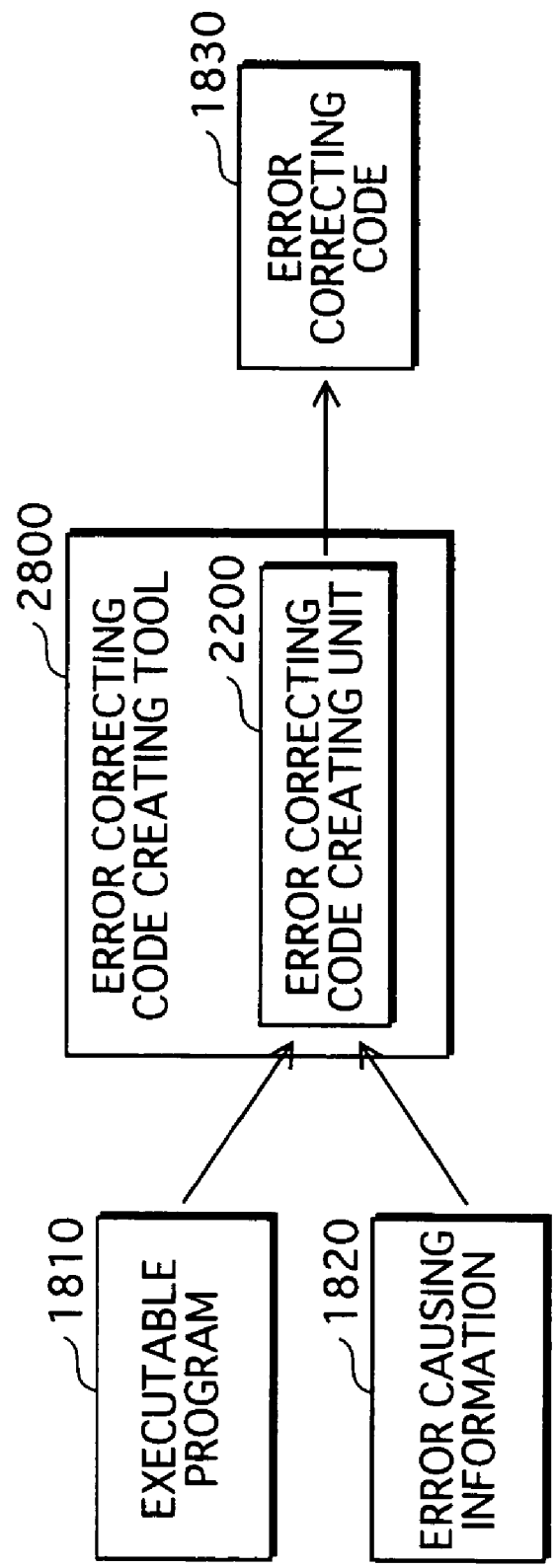
FIG. 15 is a functional block diagram of an error correcting code creating tool.

FIG. 15 is a functional block diagram of the error correcting code creating tool.

The error correcting code creating tool 2800 includes only the error correcting code creating unit 2200. The compiler 2000 in FIG. 3 has a function of creating an executable program from a source code and a function of creating an error correcting code. In contrast, the error correcting code creating tool 2800 has only a function to create an error correcting code.

Also, the error correcting code creating tool 2800 is different from the compiler 2000 on the point that the error correcting code creating tool 2800 uses an executable program which is created with a conventional compiler.

Note that the error correcting code creating unit 2200 has a same function as their correspondent in FIG. 3.

<The Third Modification>

FIG. 5 is a functional block diagram of the program execution system according to the embodiment of the present invention.

The program execution system in FIG. 5 executes an executable program in which an error is caused in specific area, that is the area where the error position information 3820 indicates.

The third modification is an example of the program execution system in the case where errors are caused in all areas of the error causing possible area 2590 (see FIG. 8).

Figure 16:
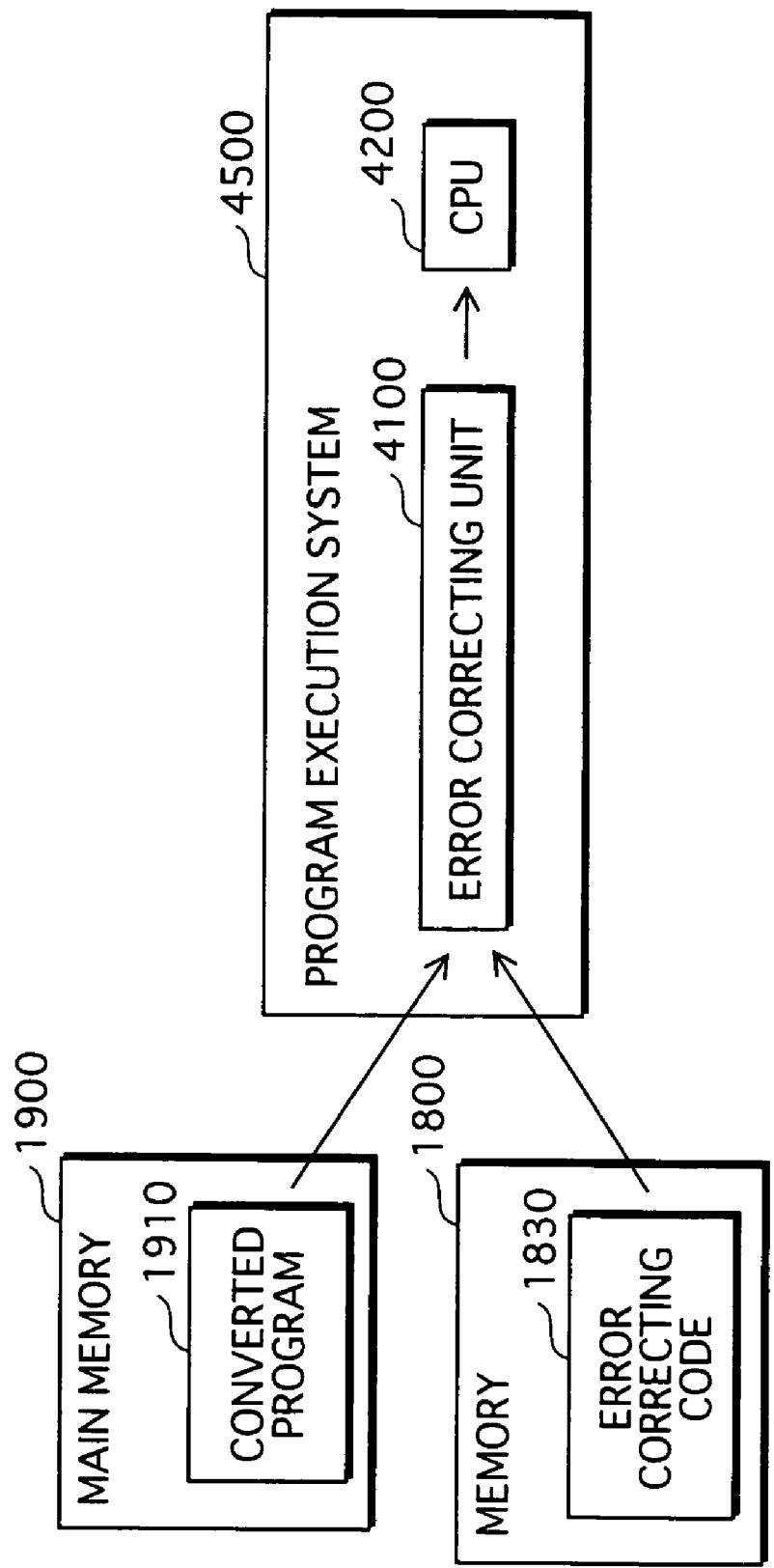
FIG. 16 is a functional block diagram of a program execution system in the case where errors are caused in all areas of an error causing possible area.

FIG. 16 is a functional block diagram of the program execution system in the case where errors are caused in all areas of the error causing possible area.

The program execution system 4500 does not include the error detecting unit 4600, which the program execution system 4000 in FIG. 5 includes. This is because the program execution system 4500 is for executing the converted program in all areas of the error causing possible area of which errors are caused, and there is no need to detect the error position. Therefore, the program execution system 4500 corrects the errors and executes the program, from the beginning of the error causing possible area.

Note that the error correcting unit 4100 and the CPU 4200 have the same functions as their correspondents in FIG. 5.

Also note that when the error causing information 1820 does not include the error position information 3820, errors are caused in all areas of the error causing possible area 2590.

<The Fourth Modification>

FIG. 8 is an example structure of an input data of the anti-tamper execution system. In FIG. 8, all the necessary data for the system is brought together.

However, among the necessary data for the anti-tamper execution system, the error causing information and the error correcting code are not necessarily located in the main memory, and may be located in external memory, such as cache memory.

Figure 17:
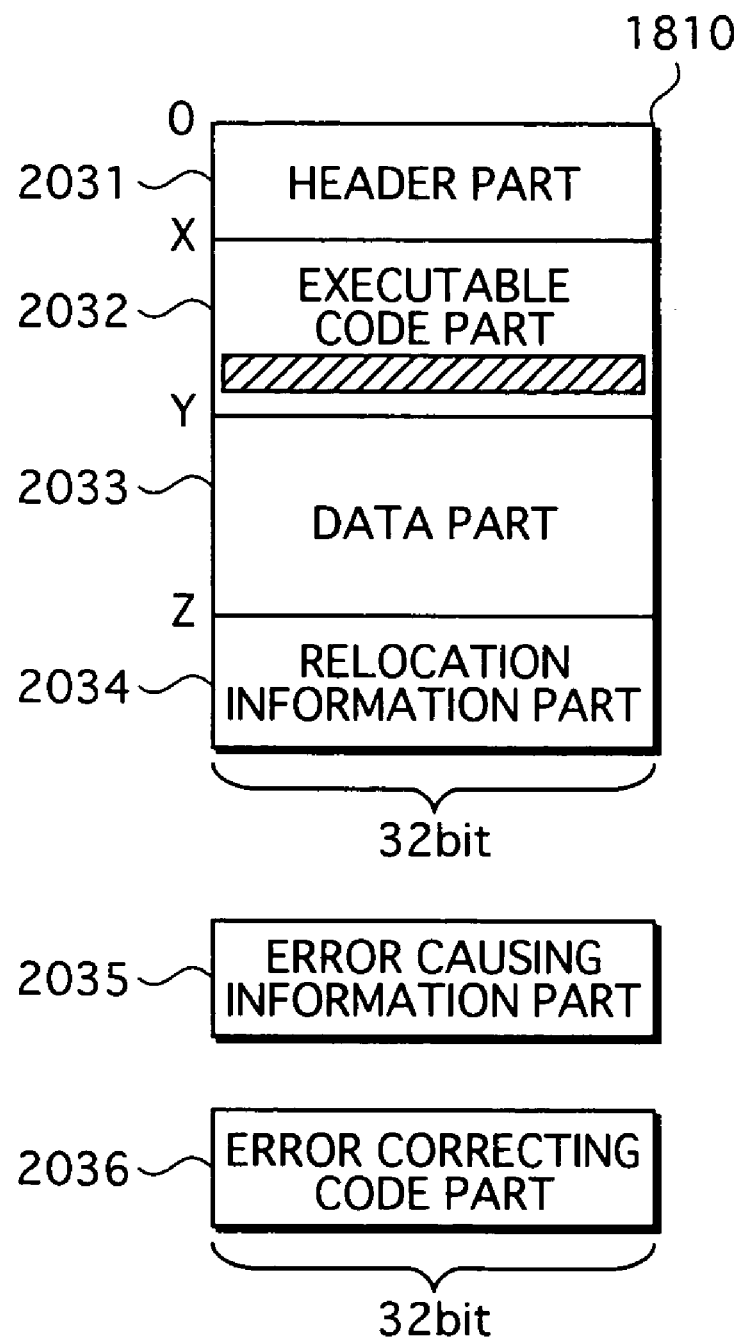
FIG. 17 represents necessary data for the anti-tamper system in the case the data separately exists.

FIG. 17 represents necessary data for anti-tamper system which separately exist.

The configuration of the executable program 1810 is same as a configuration of an executable program outputted by an ordinary compiler. The executable program 1810 includes a header part 2031, an executable code part 2032, a data part 2033, and a relocation information part 2034. Signs X to Z on the left side of FIG. 17 represent relative addresses relative to the beginning address.

The content of each part is same as that in FIG. 8.

<The Fifth Modification>

FIG. 9 represents the relation between the executable code part and the error correcting code part. In FIG. 9, the data blocks and the error correcting codes are successively located in the executable code part 2032 and the error correcting code part 2036 respectively. However, both data blocks and error correcting codes are not necessarily located successively.

Figure 18:
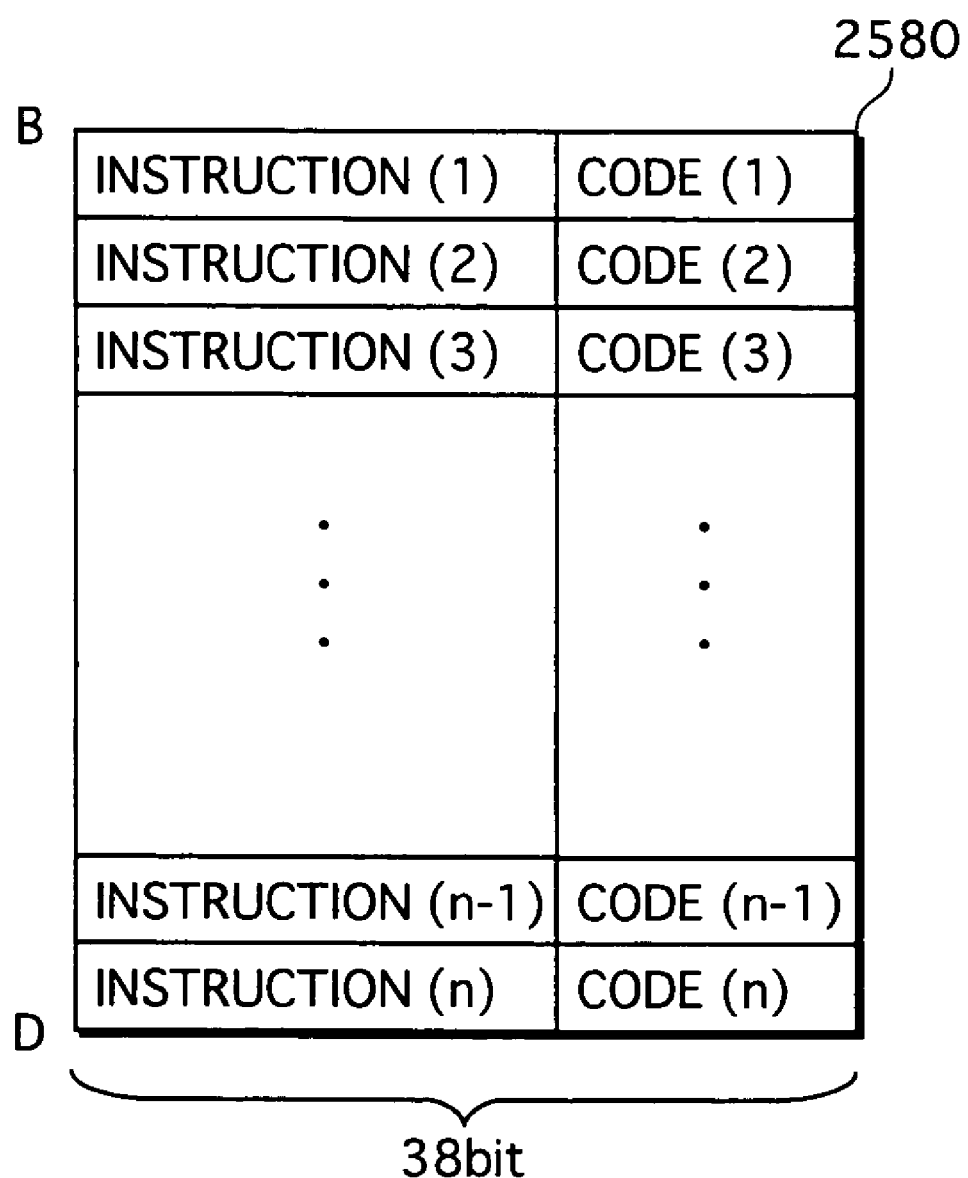
FIG. 18 is an example arrangement of data blocks and error correcting codes.

FIG. 18 is an example arrangement of data blocks and error correcting codes.

In data 2580, data blocks and their corresponding error correcting codes are arranged at successive addresses. Applying this arrangement in the executable program 2500 in FIG. 8, the error correcting code part 2036 and the executable code part 2032 is not separated, and the data block 1824 alternates with the error correcting code 1825 between the address B and the address D.

In this case, there is an advantage that data blocks and their corresponding error correcting codes can be read at once.

<The Sixth Modification>

FIG. 12 is a flowchart representing the processing of the program execution system in the case where error bits can be located at any position within the data block.

However, it is possible to limit the location of the error bits to the specific positions in the data block.

Figure 19:
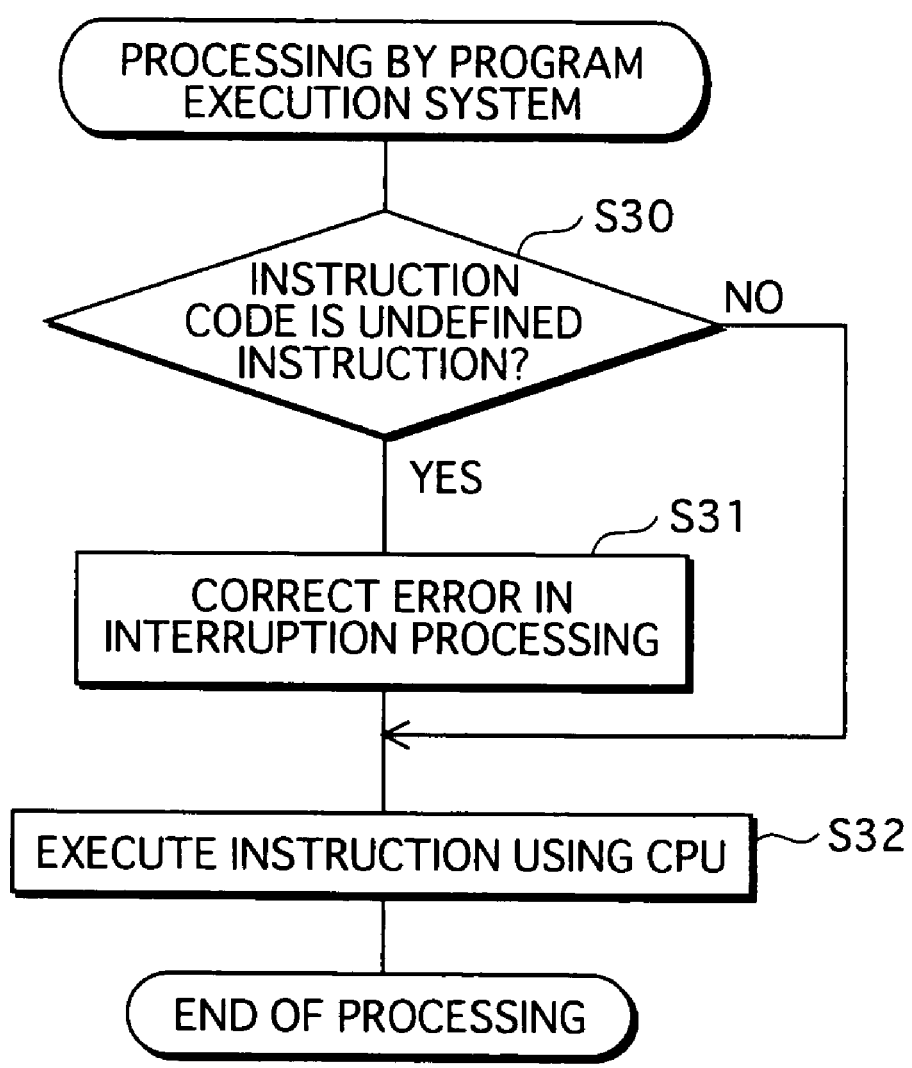
FIG. 19 is a flowchart representing the processing of a program execution system in the case where errors are caused in instruction codes of a data block.

FIG. 19 is a flowchart representing the processing of the program execution system in the case where errors are caused in instruction codes in a data block.

This modification is to cause errors in the instruction codes in a data block and to detect the errors using OS (Operating System).

In this case, an error is caused in the beginning 1-bit of an instruction code included in a fixed length 32-bit object code instruction. The error is caused in such a manner that an instruction code becomes an undefined instruction or a specific instruction.

The program is executed in the same way as the ordinary execution system.

In the case where an error is caused in an instruction code and the instruction code becomes an undefined instruction (step S30), the error is corrected in an interruption processing (step S31), which gains control at the time of an instruction exception, and the corrected code is transferred to the CPU and processed (step S32).

In the case where an error is caused in an instruction code and the instruction code becomes a specific instruction, an interruption is set to occur every time the specific instruction is read, and the error is corrected in the interruption processing as described above.

THE SECOND EMBODIMENT

A compiler and anti-tamper system according to the second embodiment of the present invention are described below with reference to FIGS. 20 to 23.

SUMMARY

Figure 20:
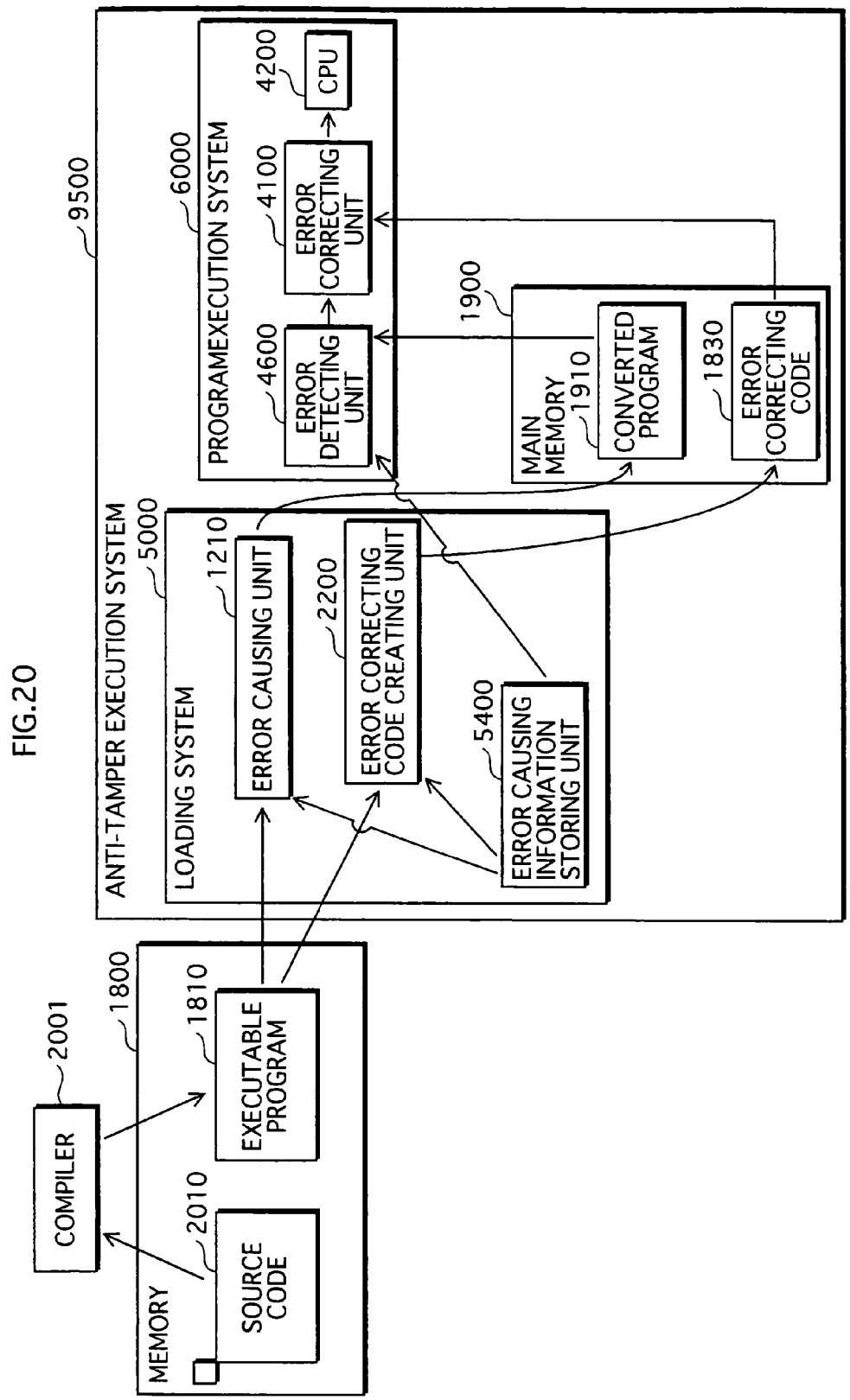
FIG. 20 is a functional block diagram of the system according to the second embodiment of the present invention.

FIG. 20 is a functional block diagram of a system according to the second embodiment of the present invention.

Two points are different between the first embodiment and the second embodiment.

The first difference is that in the first embodiment, an error correcting code has to be created before an executable program starts. However, in the second embodiment, an error correcting code does not have to be created previously, because an error correcting code is created in the loading system in the second embodiment.

The second difference is that, in the first embodiment, error causing information has to be determined previously and created in a memory. However, in the second embodiment, error causing information is determined by the loading system according to the performance of the computer, the importance of the program, the number of the executions, and so on.

A special compiler is not needed in the second embodiment, because only an executable program is necessary for the execution of the program, and an error correcting code does not have to be created before the execution. Therefore, the source code 2010 just has to be compiled by an ordinary compiler 2001 to create executable program 1810.

A program execution system 6000 is similar to the program execution system 4000 of the first embodiment in FIG. 1. The difference is that, in the program execution system 6000, error causing information included in an error causing information storing unit 5400 in the anti-tamper system 9500, not error causing information in a memory 1800, is referred to. Further, an error correcting code in a main memory 1900, not in a memory, is referred to. However, the program execution system 6000 and the program execution system 4000 are substantially the same because the error causing information storing unit 5400 and an error correcting code 1830 may be located in a memory, such as a cache memory.

The loading system, which is the difference between the first embodiment and the second embodiment, is described below.

<Configuration>

Figure 21:
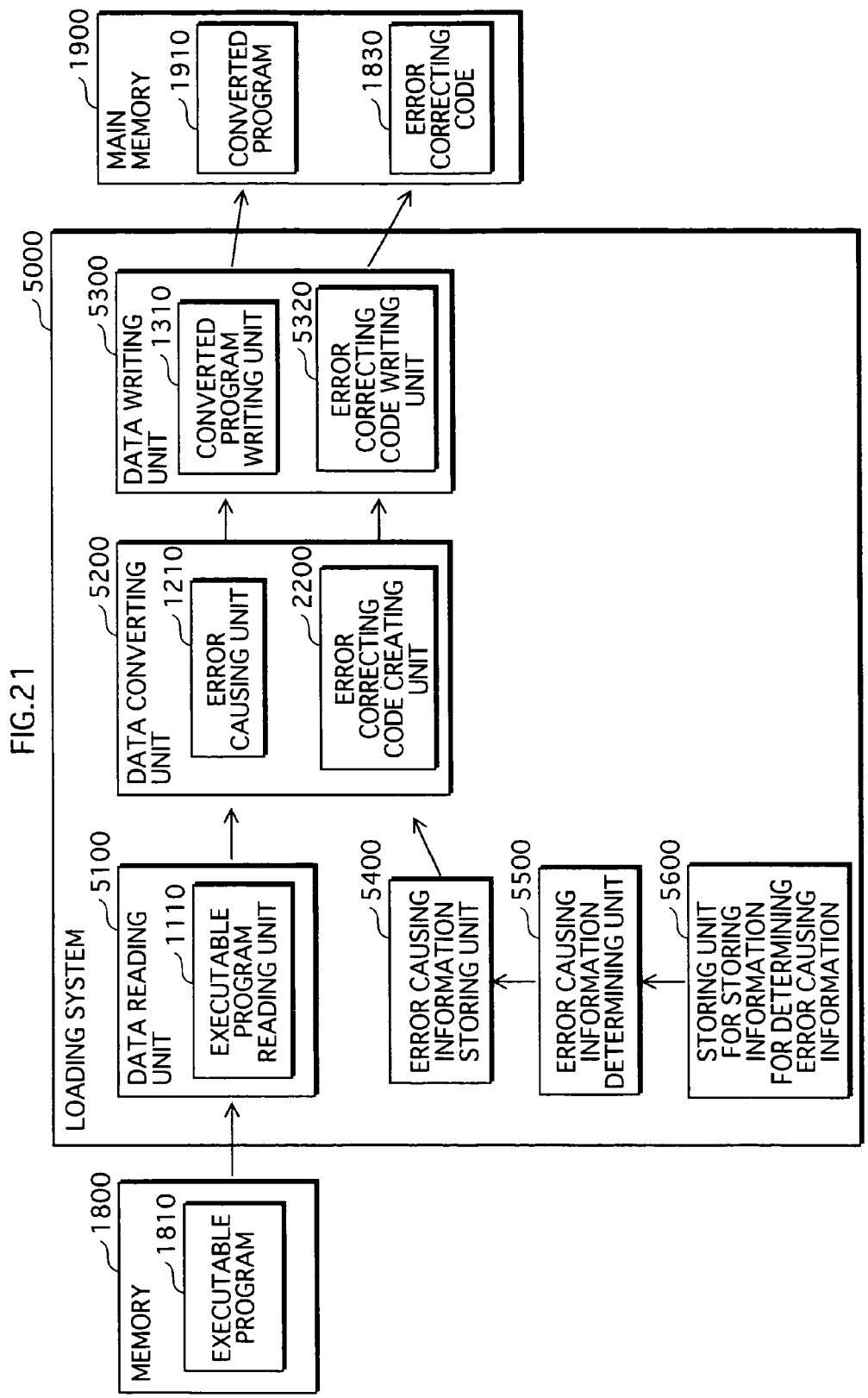
FIG. 21 is a functional block diagram of a loading system 5000 according to the second embodiment of the present invention.

FIG. 21 is a functional block diagram of a loading system 5000 according to the second embodiment of the present invention.

The loading system 5000 includes a data reading unit 5100, a data converting unit 5200, a data writing unit 5300, an error causing information storing unit 5400, an error causing information determining unit 5500, and a storing unit 5600 for storing information for determining error causing information.

The difference between the FIG. 21 and FIG. 4 of the first embodiment is described below.

The data reading unit 5100 includes only the executable program reading unit 1100, and does not include the error causing information reading unit 1120. This is because the error causing information storing unit 5400 is included in the loading system, and the error causing information does not have to be read by the error causing information reading unit 1120.

The data converting unit 5200 includes not only the error causing unit 1210 but also an error correcting code creating unit 2200. This is because the loading system creates an error correcting code.

The data writing unit 5300 includes not only the converted program writing unit 1310 but also the error correcting code writing unit 5320. This is for outputting the error correcting code created by the loading system.

The function which each unit in the second embodiment has is same as the corresponding in the first embodiment.

The error causing information storing unit 5400, the error causing information determining unit 5500, and the storing unit 5600 for storing information for determining error causing information which exist only in the second embodiment are described below.

The error causing information storing unit 5400 stores the error causing information 1820.

The error causing information determining unit 5500 has a function of determining the error causing information which indicates an area where an error is to be caused based on the performance of the execution system.

The storing unit 5600, for storing information for determining error causing information, stores information for determining the error causing information. The information for determining the error causing information is described below with reference to FIG. 22.

The error causing information 1820 stored in the error causing information storing unit 5400 is same as the data in FIG. 6 and FIG. 7 of the first embodiment.

FIG. 22 is an example of the structure and the content of the information for determining the error causing information.

The information for determining error causing information 5610 includes CPU performance information 5611, and an error causing area information 5612.

The CPU performance information 5611 represents the performance of the CPU of the computer which executes the executable program 1810. The error causing area information 5612 indicates the area where an error is to be caused.

<Operations>

When the executable program 1810 is started, the executable program reading unit 1110 reads the executable program in the memory into the work area of the loading system 5000.

The read executable program is decrypted by the data reading unit 5100 and transferred to the error causing unit 1210 and to the error correcting code creating unit 2200.

The error causing unit 1210, which received the executable program, refers to the error causing information 1820 in the error causing information storing unit 5400, and causes an error. This processing is same as the processing of the error causing unit in the first embodiment.

The error correcting code creating unit 2200 which received the executable program refers to the error causing information 1820 in the error causing information storing unit 5400 and creates an error correcting code. This processing is same as the processing of the compiler of the first embodiment.

The converted program 1910, in which an error is caused by the error causing unit 1210, is written into the main memory 1900 by the converted program writing unit 1310. Also, the error correcting code 1830, which is created by the error correcting code creating unit 2200, is written into the main memory 1900 by the error correcting code writing unit 5320.

After the converted program and the error correcting code are written in the main memory, the program execution system 6000 executes the converted program.

The way for the error causing information 1820 in the error causing information storing unit 5400 to be determined by the error causing information determining unit is described below. The error causing information 1820 is referred to by the error causing unit 1210 and the error correcting code creating unit 2200.

Figure 23:
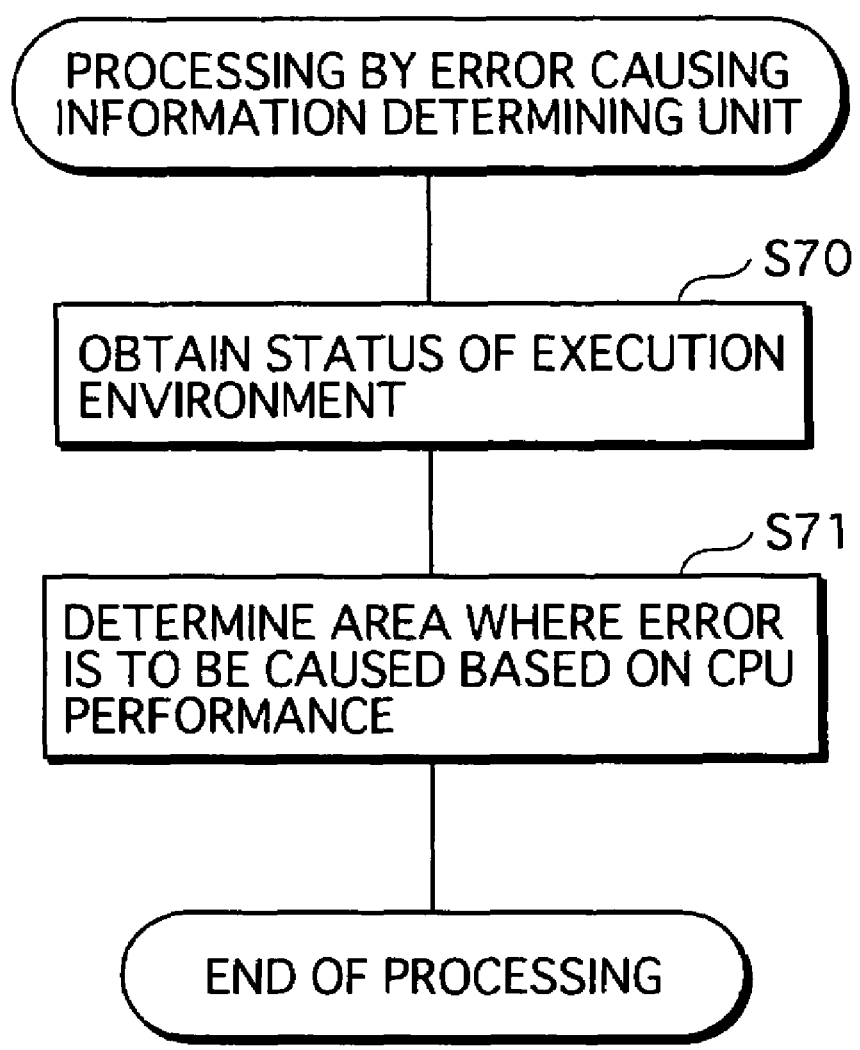
FIG. 23 is a flowchart representing the processing of an error causing information determining unit.

FIG. 23 is a flowchart representing the processing of the error causing information determining unit.

Note that the anti-tamper execution system 9500 is an apparatus of which the performance of the CPU is switchable. Also note that the error causing information determining unit works when the CPU performance is switched.

The error causing information determining unit 5500 obtains the CPU performance information of the execution environment (step S70). The error causing information determining unit 5500 refers to the information for determining error causing information 5610 based on the obtained CPU performance information, determines the area where error is to be caused (step S71), and rewrites the error causing information 1820.

For instance, when the CPU performance is 1.8 GHz, the start address in the error causing position information in FIG. 7 is "C" and the area size is "D-C". When the CPU performance is 2.66 GHz, the start address in the error causing position information in FIG. 7 is "C" and the area size changes to "E-C".

<Supplementary Description>

The system according to the present invention is described above based on the embodiments. However, the system can be modified partly, and the present invention is not limited to the above-described embodiments. In other words:

(1) Although the information for determining error causing information in FIG. 22 includes a combination of the CPU performance information and an error causing area information, the combination may be the CPU performance information and a number of errors in each data block. The combination also may be an importance level of the program and the number of errors in each data block. In this case, means for obtaining analysis protection level information according to the importance level of the program is needed. For instance, the analysis protection level information may be set in the header part of an executable program.

(2) A program, which is for a CPU to execute each processing for realizing each function of each system in the embodiments can be stored in storage media and distributed, or distributed via various networks. The storage media may be IC cards, optical discs, flexible disks, ROM or the like. The distributed program is stored in a memory or the like which is readable by a CPU of an apparatus, and the program is executed by the CPU. As a result, each function of the each system of the embodiments is realized.

(3) The memory 1800 of the embodiments may be a local memory, such as a cache memory, or storage media or the like.

(4) The error causing information storing unit 5400 and the error correcting code 1830 of the second embodiment may be located in a memory such as a cache memory.

(5) Although the error causing information determining unit 5500 of the second embodiment determines the error causing information 1820 based on the CPU performance of the execution environment, the error causing information determining unit 5500 may determine the error causing information based on the importance level of the executable program. In this case, the error causing information determining unit 5500 has to be notified of the importance level of the program in such a manner that the header part of the executable program includes information which indicates the importance level of the program.

In the second embodiment, the error causing information determining unit works when the CPU performance is switched. However, in the case where the error causing information is determined based on the importance level, or the like, of the executable program, the processing of the error causing information determining unit has to be at the right time, such as before the execution of the executable program.

(6) Although the error position information 3820 indicates an area where an error is to be caused, the error position information 3820 may be an address table which indicates the position of a data block in the executable program where an error is caused, or a calculating formula for the address. Also the error position information 3820 may indicate the position within the data block where an error is caused, such as an instruction code part of an object code.

(7) In the embodiments, the error causing unit 1210 randomly chooses a bit, which is to be inverted when causing an error in a data block, which means that a rule based on which an error is caused changes every time an executable program is started. In the case where one executable program is started repeatedly, the rule changes every time the program is started.

However, the rule does not have to be changed every time an executable program is started. Even in the case where one executable program is started repeatedly, the rule may not change.

Furthermore, when causing an error, a mask may be used to invert particular bits.

Also, when causing errors, the number of the errors is not necessarily same as the number which the number of error bits 1823 indicates, and the number of bits which are to be inverted may be randomly determined as far as the number is no more than the number of error bits 1823, which means that the number of bits to be inverted may be changed according to each data block and each executable program. In the case where one executable program is started repeatedly, the number of bits to be inverted may be changed every time the program is started. Also, in the case where one executable program is started repeatedly the number of bits to be inverted may be the same for each time.

Note that an error is not necessarily caused, in a data block in which an error is to be caused, and the error may not be caused.

(8) Although, the error causing information is created and errors are caused based on the error causing information in the embodiments, errors may be caused based on a fixed rule which is previously formulated.

(9) Although only the executable program is encrypted in the embodiments, the error causing information 1820, the error correcting code 1830, and so on may be encrypted.

(10) In the case where data within the error causing area is located in the main memory indifferent status than the compiler outputs, according to a linker or information of the relocation information part 2034, the loading system 1000 and the error detecting unit 4600 have to be notified of the error correcting code corresponding to the address of the data in which errors are caused.

(11) Although the error correcting code 1830 is created to correspond to the executable program 1810 created by the compiling unit 2100 in the first embodiment, the error correcting code may be created corresponding to a linked executable program.

(12) Although the error correcting code is created to correspond to the executable program which the loading system reads from the main memory in the second embodiment, the error correcting code may be created corresponding to a program which is relocated according to the information of the relocation information part 2034.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

ADVANTAGEOUS EFFECT OF THE INVENTION

As described above, the data conversion system according to the present invention comprises: a data obtaining unit operable to obtain data which is required to be kept secret; an error causing unit operable to convert the obtained data in such a manner that an error is caused in the obtained data; and a data output unit operable to output the conversion result data, wherein the error causing unit causes the error within a range in which the caused error is correctable based on the conversion result data and an error correcting code.

The data obtaining unit may obtain error causing information which indicates at least a block length and an allowable maximum number of error bits, and the error causing unit may perform the conversion by changing values of bits in each data block included in the data, a number of the bits being not more than the allowable maximum number of error bits, each data block having the block length indicated by the error causing information.

This allows an error to be caused within a range in which the caused error is correctable based on an error correcting code, making analysis and tampering of the program difficult. Also, the conversion result data is allowed to be different every time the data is converted, because any bit within a range in which the error is correctable based on the error correcting code can be an error bit, making analysis and tampering of the data difficult.

The data may be an executable program. The data obtaining unit may obtain the executable program and the error causing information from a storage medium. The conversion result data may be the executable program in which the error is caused in each data block, and the data output unit outputs the executable program into a main memory which is accessed by a CPU which processes the executable program.

This allows the error artificially caused in the executable program in the main memory, making analysis and tampering of the program difficult. Also, different errors can be caused every time the executable program is loaded into main memory, making analysis and tampering of the program by trial and error difficult.

The obtainment by the data obtaining unit, the conversion by the error causing unit, and the output by the data output unit may be performed when an instruction to start the executable program is received, and the data conversion system may comprise: an error correcting code obtaining unit operable to obtain an error correcting code for correcting the error caused in the executable program in the main memory; an error correcting unit operable to correct the error in the executable program with reference to the error correcting code; and a program execution unit operable to execute the executable program, the error in which is corrected by the error correcting unit.

This allows the data conversion system to simultaneously correct the error and execute the program. As a result, the executable program, whose error is corrected, cannot be referred by an analyzer, which makes analysis and tampering of the program difficult.

The error causing unit may convert the executable program in such a manner that the error causing unit changes values of different bits from the preceding conversion every time the instruction to start the executable program is received.

This allows the executable program, which is loaded into the main memory, to be different from the executable program started and loaded previously in the case the executable program is executed multiple times. As a result, analysis and tampering of the program by trial and error becomes difficult.

The error causing unit may cause the error in an instruction code included in the executable program.

This allows the instruction code in machine language to become an instruction code which has a different function from the original, or an instruction code which causes an instruction exception. As a result, analysis and tampering with a debugger or the like becomes difficult. Also, the executable program in which an error is caused can be executed only by adding a function to the interruption processing of OS, which means the workload for developing the system can be reduced.

The data conversion system may further comprise: an error correcting code creating unit operable to create the error correcting code based on the data obtained by the data obtaining unit; an error correcting code output unit operable to output the error correcting code; and an error causing information storing unit operable to store error causing information which indicates at least a block length and an allowable maximum number of error bits, and the error causing unit may perform the conversion by changing values of bits in each data block included in the data, a number of the bits being not more than the allowable maximum number of error bits, each data block having the block length indicated by the error causing information.

As a result, the error correcting code is not needed to be created before the execution of the program, which means that analysis and tampering of the program is difficult even if the program is created by a conventional compiler.

The data conversion system may further comprise: a relation information storing unit operable to store information on a relation between predetermined conditions and the error causing information; a status detecting unit operable to detect a status which meets any of the predetermined conditions; and an error causing information modifying unit operable to modify the error causing information stored in the error causing information storing unit so as to meet any of the predetermined conditions corresponding to the detected status.

This allows the number and the position of the error, which is caused in the executable program, to be changed at the time of the execution of the program. As a result, the difficulty level of the program analysis can be changed according to the execution environment or the importance level of the program.

The error causing information may include error position information for specifying a relative address of the data obtained by the data obtaining unit relative to a start address, and the error causing unit may cause the error in an area which is indicated by the error position information.

This allows the error to be caused at the arbitrary position in the executable program. As a result, the error can be concentrated in the area which is especially required to be kept secret in the executable program.

As described above, the program execution system according to the present invention comprises: an error correcting code obtaining unit operable to obtain an error correcting code for correcting an error caused in an executable program; an error correcting unit operable to correct the error in the executable program with reference to the error correcting code; and a program execution unit operable to execute the executable program, the error in which is corrected by the error correcting unit.

Here, the program execution system may further comprise: an error detecting unit operable to detect a position of the error which is caused in the executable program.

This allows the program execution system to simultaneously correct the error and execute the program. As a result, the executable program, whose error is corrected, cannot be referred by an analyzer, which makes analysis and tampering of the program difficult.

Also, the error correcting unit may collect information indicating positions of bits included in the error or values of the bits, and may use the collected information for a predetermined processing.

This allows irrelevant data to the program to be stored in the computer only by the execution of the program. As a result, the data can be kept secret from an analyzer, which means analysis and tampering with the data becomes difficult.

Also, the data conversion system may further comprise: a source code obtaining unit operable to obtain an external source code; and a compiling unit operable to translate the source code obtained by the source code obtaining unit into an object code, wherein the data is the object code, the error causing unit converts the object code in such a manner that the error is caused in the object code, and the conversion result data is the object code in which the error is caused.

This allows the error to be caused at the time of compiling the source code. As a result, meaningful information can be included in the error and provided to the anti-tamper execution system. Also, the executable program can be executed only by the anti-tamper execution system according to the present invention, not by ordinary execution system, because the error is caused in the executable program.

What is claimed is:

1. A data conversion system comprising:
   a data obtaining unit operable to obtain data which is required to remain secret;
   an error causing unit operable to convert the obtained data to cause an error in the obtained data; and
   a data output unit operable to output the obtained data converted by the error causing unit as conversion result data,
   wherein, when the data obtaining unit obtains the data, the error causing unit randomly causes the error in the obtained data, and
   wherein the randomly caused error is within a range in which the randomly caused error is correctable based on the conversion result data and an error correcting code.

2. The data conversion system of claim 1, wherein:
   the data obtaining unit obtains error causing information which indicates at least a block length and an allowable maximum number of error bits of each respective data block included in the obtained data;
   the error causing unit performs the conversion by changing values of bits in each data block included in the obtained data; and
   a number of the bits changed in each data block is not more than the respective allowable maximum number of error bits.

3. The data conversion system of claim 2, wherein:
   the obtained data is an executable program;
   the data obtaining unit obtains the executable program and the error causing information from a storage medium;
   the conversion result data is the executable program in which the error is caused in each data block; and
   the data output unit outputs the executable program into a main memory which is accessed by a CPU which processes the executable program.

4. The data conversion system of claim 3, wherein:
   the obtainment by the data obtaining unit, the conversion by the error causing unit, and the output by the data output unit are performed when an instruction to start the executable program is received; and
   the data conversion system further comprises:
      an error correcting code obtaining unit operable to obtain the error correcting code for correcting the error caused in the executable program in the main memory;
      an error correcting unit operable to correct the error in the executable program with reference to the error correcting code; and
      a program execution unit operable to execute the executable program having the error corrected by the error correcting unit.

5. The data conversion system of claim 4, wherein the error causing unit converts the executable program to change values of bits, which are different from bits changed in a preceding conversion, every time the instruction to start the executable program is received.

6. The data conversion system of claim 5, wherein the error causing unit causes the error in an instruction code included in the executable program.

7. The data conversion system of claim 6, wherein:
   the error causing information includes error position information for specifying an area in the data obtained by the data obtaining unit; and
   the error causing unit causes the error in the area which is indicated by the error position information.

8. The data conversion system of claim 3, wherein the error causing unit causes the error in an instruction code included in the executable program.

9. The data conversion system of claim 2, wherein:
   the error causing information includes error position information for specifying an area in the data obtained by the data obtaining unit; and the error causing unit causes the error in the area which is indicated by the error position information.

10. The data conversion system of claim 1, further comprising:
an error correcting code creating unit operable to create the error correcting code based on the data obtained by the data obtaining unit;
an error correcting code output unit operable to output the error correcting code; and
an error causing information storing unit operable to store error causing information which indicates at least a block length and an allowable maximum number of error bits of each respective data block included in the obtained data,
wherein the error causing unit performs the conversion by changing values of bits in each data block included in the obtained data, and
wherein a number of the bits changed in each data block is not more than the respective allowable maximum number of error bits.

11. The data conversion system of claim 10, further comprising:
a relation information storing unit operable to store information on a relation between predetermined conditions and the error causing information;
a status detecting unit operable to detect a status which meets any of the predetermined conditions; and
an error causing information modifying unit operable to modify the error causing information stored in the error causing information storing unit to meet any of the predetermined conditions corresponding to the detected status.

12. The data conversion system of claim 11, wherein:
the error causing information includes error position information for specifying an area in the data obtained by the data obtaining unit; and
the error causing unit causes the error in the area which is indicated by the error position information.

13. The data conversion system of claim 10, wherein:
the error causing information includes error position information for specifying an area in the data obtained by the data obtaining unit; and
the error causing unit causes the error in the area which is indicated by the error position information.

14. The data conversion system of claim 1, wherein:
the data conversion system further comprises:
a source code obtaining unit operable to obtain an external source code; and
a compiling unit operable to translate the source code obtained by the source code obtaining unit into an object code;

the obtained data is the object code;
the error causing unit converts the object code to cause the error in the object code; and
the conversion result data is the object code in which the error is caused by the error causing unit.

15. A program execution system comprising:
an executable program loading unit operable to load an executable program that (i) is stored in a memory, and (ii) includes an error that is randomly caused when the program execution system receives an instruction to start executing the executable program, and is within a range in which the randomly caused error is correctable based on the executable program and an error correcting code for correcting the error caused in the executable program;
an error correcting code obtaining unit operable to obtain the error correcting code;
an error correcting unit operable to correct the error in the executable program with reference to the error correcting code; and
a program execution unit operable to execute the executable program having the error corrected by the error correcting unit.

16. The program execution system of claim 15, further comprising an error detecting unit operable to detect a position of the error in the executable program.

17. The program execution system of claim 16, wherein the error correcting unit is operable to collect information indicating positions of bits included in the error or indicating values of the bits included in the error, and operable to use the collected information for a predetermined processing.

18. The program execution system of claim 15, wherein the error correcting unit is operable to collect information indicating positions of bits included in the error or indicating values of the bits included in the error, and operable to use the collected information for a predetermined processing.

19. A data conversion method comprising:
obtaining data which is required to remain secret;
converting the obtained data to cause an error in the obtained data; and
outputting the obtained data converted by the converting of the obtained data as conversion result data,
wherein, when the obtaining of the data obtains the data, the converting of the obtained data randomly causes the error in the obtained data, and
wherein the randomly caused error is within a range in which the randomly caused error is correctable based on the conversion result data and an error correcting code.

* * * * *